United States Patent
German

(10) Patent No.: US 9,518,161 B2
(45) Date of Patent: Dec. 13, 2016

(54) POLYMER COMPOSITIONS, METHODS OF MAKING THE SAME, AND ARTICLES MADE THEREFROM

(71) Applicant: ExxonMobil Chemical Patents Inc., Baytown, TX (US)

(72) Inventor: Paul M. German, Friendswood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 314 days.

(21) Appl. No.: 14/285,050

(22) Filed: May 22, 2014

(65) Prior Publication Data

US 2015/0030867 A1    Jan. 29, 2015

Related U.S. Application Data

(60) Provisional application No. 61/857,352, filed on Jul. 23, 2013.

(51) Int. Cl.
| | | |
|---|---|---|
| *B32B 27/08* | (2006.01) | |
| *C08J 5/18* | (2006.01) | |
| *B32B 27/32* | (2006.01) | |

(52) U.S. Cl.
CPC ............ *C08J 5/18* (2013.01); *B32B 27/08* (2013.01); *B32B 27/32* (2013.01); *B32B 2250/242* (2013.01); *B32B 2307/558* (2013.01); *B32B 2439/40* (2013.01); *B32B 2439/70* (2013.01); *C08J 2323/06* (2013.01); *C08J 2423/02* (2013.01); *C08J 2423/12* (2013.01); *C08J 2423/14* (2013.01); *Y10T 428/31913* (2015.04)

(58) Field of Classification Search
CPC ....... C08J 5/18; C08J 2323/06; C08J 2423/12; C08J 2323/14; B23B 2250/03; B23B 27/32

See application file for complete search history.

(56) References Cited

U.S. PATENT DOCUMENTS

2007/0240605 A1* 10/2007  Iyer .................. C08L 23/10
                                                     106/31.6

FOREIGN PATENT DOCUMENTS

WO      WO 00/69963      11/2000

* cited by examiner

*Primary Examiner* — Eisa Elhilo
(74) *Attorney, Agent, or Firm* — Priya G. Prasad

(57) ABSTRACT

The present disclosure is directed to compositions and methods for improving the cling performance in stretch-cling films. Compositions include: (a) 80.0 to 99.5 wt. % of a propylene-based elastomer, the propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g; and (b) 0.5 to 20.0 wt. % of a polyalphaolefin, wherein the amounts of the propylene-based elastomer, and the polyalphaolefin are based on the weight of the composition. Methods of making such compositions as well as compositions including an ethylene-based polymer and films and methods of making films are also disclosed.

24 Claims, No Drawings

POLYMER COMPOSITIONS, METHODS OF MAKING THE SAME, AND ARTICLES MADE THEREFROM

CROSS REFERENCE TO RELATED APPLICATIONS

This application claims the benefit Application No. 61/857,352, filed Jul. 23, 2013, the disclosure of which is hereby incorporated by reference in its entirety.

FIELD OF THE INVENTION

This invention relates to polymer compositions and associated films. More particularly, this invention relates to compositions for improving the cling performance in stretch-cling films comprising a propylene-based elastomer and a polyalphaolefin, methods of making the same, and articles made therefrom.

BACKGROUND OF THE INVENTION

Stretch-cling films have wide application, including bundling packaged food and other goods. One application of particular interest is in the bundling of goods for shipping and storage, for example, the bundling of large rolls of carpet, fabric, or the like. A film having cling properties to prevent unraveling of the film from the pallet is therefore desirable. To impart cling properties or improve the cling properties of a particular film, a number of techniques have been employed, such as the addition of tackifying additives or use of polar ethylene copolymers such ethylene acrylates in the (co) polymer. Common tackifying additives include polybutenes, terpene resins, alkali metal and glycerol stearates, and oleates and hydrogenated rosins, and rosin esters.

Certain soft polyolefin polymers have been used to enhance cling properties of polyolefins. While at relatively low levels, the soft polymer tends to disperse in the polyolefin matrix, at higher levels the soft polymer tends to aggregate, forming domains within the polyolefin matrix, thereby placing an upper limit on the amount of soft polymer that can be incorporated for cling improvement. In other words, after a certain concentration, the addition of more of the soft polyolefin does not improve the cling performance and may contribute to other undesirable film properties such as blocking. In addition, cling performance can suffer in particular in dusty or low temperature environments. A composition suitable for cling films that can increase the cling performance of the film particularly in challenging environments would be useful. Methods of making and using such compositions and films would also be useful.

Background references include WO 00/69963.

SUMMARY OF THE INVENTION

In one aspect there is provided a composition for improving the cling performance in stretch-cling films, the composition comprising: a) 80.0 to 99.5 wt. % of a propylene-based elastomer, the propylene-based elastomer comprising at least about 60.0 wt. %, preferably at least 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and b) 0.5 to 20.0 wt. % of a polyalphaolefin, wherein the amounts of the propylene-based elastomer, and the polyalphaolefin are based on the weight of the composition.

In another aspect there is provided a composition comprising: (a) 99.8 to 50.0 wt. % of an ethylene-based polymer; (b) 0.1 to 25.0 wt. % of a propylene-based elastomer, the propylene-based elastomer comprising at least about 60.0 wt. %, preferably at least about 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and (c) 0.1 to 25.0 wt. % of a polyalphaolefin, wherein the amounts of the ethylene-based polymer, the propylene-based elastomer, and the polyalphaolefin are based on the weight of the composition.

In still another aspect there is provided a method of making a composition comprising: combining i) 99.8 to 50.0 wt. % of an ethylene-based polymer; ii) 0.1 to 25.0 wt. % of a propylene-based elastomer, the propylene-based elastomer comprising at least about 60.0 wt. %, preferably at least about 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and iii) 0.1 to 25.0 wt. % of a polyalphaolefin, wherein the amounts of the ethylene-based polymer, the propylene-based elastomer, and the polyalphaolefin are based on the weight of the composition.

Still another aspect provides film comprising: (a) a Layer A comprising (i) 99.8 to 50.0 wt. % of a first ethylene-based polymer; (ii) 0.1 to 25.0 wt. % of a first propylene-based elastomer, the propylene-based elastomer comprising at least about 60.0 wt. %, preferably at least about 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and (iii) 0.1 to 25.0 wt. % of a first polyalphaolefin, wherein the amounts of the first ethylene polymer, the first propylene-based elastomer, and the first polyalphaolefin are based on the total weight of Layer A.

Yet another aspect provides a method for providing a film having a cling force in a stretched state, comprising: (a) forming a composition from at least (i) 99.8 to 50.0 wt. % of an ethylene-based polymer; (ii) 0.1 to 25.0 wt. % of a propylene-based elastomer, the propylene-based elastomer comprising at least about 60.0 wt. %, preferably at least about 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; wherein the amounts of the ethylene-based polymer, the propylene-based elastomer, and the polyalphaolefin are based on the total weight of the composition; and (iii) 0.1 to 25.0 wt. % of a polyalphaolefin; and (b) forming the composition into at least one layer of the film.

Still another aspect provides a method for improving the cling performance of a film in a stretched state comprising: a) providing a first composition comprising i) 80.0 to 99.5 wt. % of a propylene-based elastomer, the propylene-based elastomer comprising at least about 60.0 wt. %, particularly 75.0 to about 95 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g and ii) 0.5 to 20.0 wt. % of a polyalphaolefin; (b) combining the first composition with an ethylene-based polymer to form a second composition, the second composition comprising: (i) 99.8 to 50.0 wt. % of an ethylene-based polymer; (ii) 0.1 to 25.0 wt. % of the propylene-based elastomer; and (iii) 0.1 to 25.0 wt. % of the polyalphaolefin; and (c) forming a film comprising a cling layer A comprising the second composition.

DETAILED DESCRIPTION OF THE INVENTION

Embodiments of the invention provide polymer compositions having a unique combination of properties, particularly suitable for films for use in applications requiring enhanced cling. Embodiments also may provide improved ability to modify and/or control cling in a stretched film, particularly applications that typically use relatively thicker or stiffer films or where films are used in more demanding applications such as exposure to dust or other environmental factors.

Various specific embodiments will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, when a polymer or oligomer is referred to as comprising a monomer, the monomer present in the polymer or oligomer is the polymerized or oligomerized form of the monomer, respectively. The term "polymer" is meant to encompass homopolymers and copolymers. The term copolymer includes any polymer having two or more different monomers in the same chain, and encompasses random copolymers, statistical copolymers, interpolymers, and block copolymers.

As used herein, when a polymer composition or blend is said to comprise a certain percentage, wt. %, of a monomer, that percentage of monomer is based on the total amount of monomer units in all the polymer components of the composition or blend. For example, if a composition or blend comprises 50 wt. % of polymer A, which has 20 wt. % monomer X, and 50 wt. % of a polymer B, which has 10 wt. % monomer X, the composition or blend comprises 15 wt. % of monomer X.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)".

A "polyolefin" is a polymer comprising at least 50 mole % of polymer units derived from one or more olefin monomers. Preferably a polyolefin comprises at least 60 mole % (preferably at least 70 mole %, preferably at least 80 mole %, preferably at least 90 mole %, preferably at least 95 mole %, preferably 100 mole %) of polymer units derived from one or more olefin monomers, preferably 1-olefins, having carbon numbers of 2 to 20 (preferably 2 to 16, preferably 2 to 10, preferably 2 to 8, preferably 2 to 6). Preferably a polyolefin has an $M_n$ of 20 kg/mol or more, preferably 40 kg/mol or more (preferably 60 kg/mol or more, preferably 80 kg/mol or more, preferably 100 kg/mol or more).

The term "ethylene-based polymer" as used herein refers to a polyolefin comprising at least 50.0 mole % of polymer units derived from ethylene. In some embodiments, the lower limit on the range of ethylene content may be 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole % based on the mole % of polymer units derived from ethylene. Ethylene-based polymers of the invention can have an upper limit on the range of ethylene content of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene.

Ethylene-based polymers generally have less than 50.0 mole % of polymer units derived from a $C_3$ to $C_{20}$ olefin, preferably an α-olefin. The lower limit on the range of $C_3$ to $C_{20}$ olefin-content may be 25.0 mole %, 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$ to $C_{20}$ α-olefin. The upper limit on the range of $C_3$ to $C_{20}$ olefin-content may be 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on all polymer units derived from the $C_3$ to $C_{20}$ α-olefin. In some embodiments, low $C_3$ to $C_{20}$ content, e.g., 0.0 to 5.0 mole %, α-olefins are preferred. Comonomer content is based on the total content of all monomer monomer-derived units in the polymer.

The α-olefin comonomer may be linear or branched, and two or more comonomers may be used, if desired. Examples of suitable α-olefin comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene being most preferred. Ethylene-based polymers having more than two types of monomers, such as terpolymers, are intended to be included within the term "polymer" or "copolymer" as used herein. Particular types of ethylene-based polymers are described herein below.

The term "molecular weight distribution" ("MWD") is equivalent to the expression $M_w/M_n$. The expression $M_w/M_n$ is the ratio of the weight average molecular weight ($M_w$) to the number average molecular weight ($M_n$). The weight average molecular weight is given by:

$$M_w = \frac{\sum_i n_i M_i^2}{\sum_i n_i M_i}$$

The number average molecular weight is given by:

$$M_n = \frac{\sum_i n_i M_i}{\sum_i n_i}$$

The z-average molecular weight is given by:

$$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, p. 6812 (2001).

The term "Composition distribution breadth index" (CDBI) is defined as the weight percentage of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, Vol. 20, p. 441 (1982) and U.S. Pat. No. 5,008,204, which are fully incorporated herein by reference.

Solubility distribution breadth index ("SDBI") is used as a measure of the breadth of the solubility distribution curve for a given polymer. The procedure used herein for calculating SDBI is as described in PCT Patent Application No. WO 93/03093, pp. 16-18, published Feb. 18, 1993.

Both CDBI and SDBI may be determined using data obtained via CRYSTAF. In such cases, a commercial CRYSTAF model 200 instrument (PolymerChar S.A.) is used for chemical composition distribution (CCD) analysis. Approximately 20 to 30 mg of polymer is placed into each reactor and dissolved in 30 mL of 1,2 dichlorobenzene at 160° C. for approximately 60 minutes, then allowed to equilibrate for approximately 45 minutes at 100° C. The polymer solution is then cooled to either 30° C. (standard procedure) or 0° C. (cryo procedure) using a cooling rate of 0.2° C./min. A two wavelength infrared detector is then used to measure the polymer concentration during crystallization (3.5 μm, 2853 cm$^{-1}$ sym. stretch) and to compensate for base line drifts (3.6 μm) during the analysis time. The solution concentration is monitored at certain temperature intervals, yielding a cumulative concentration curve. The derivative of this curve with respect to temperature represents the weight fraction of crystallized polymer at each temperature. In both standard and cryo procedures, any resin in solution below the temperature to which the solution is cooled is defined as "% solubles". The cryo procedure outlined above, i.e., cooling to 0° C., typically provides greater detail, especially for amorphous samples that tend to stay in solution at or around 30° C.

Long-chain branching of polymers described herein can be determined using $^{13}$C nuclear magnetic resonance (NMR) spectroscopy and to a limited extent, e.g., for ethylene homopolymers and for certain copolymers, and it can be quantified using the method of Randall, (Journal of Macromolecular Science, Rev. Macromol. Chem. Phys., C29 (2&3), pp. 285-297). The number of carbon atoms on the long-chain branches ranges from a chain length of at least one carbon more than two carbons less than the total number of carbons in the comonomer to several thousands. For example, a long-chain branch of an ethylene/hexene ethylene-based polymer is at least five (5) carbons in length (i.e., 6 carbons less 2 equals 4 carbons plus one equals a minimum branch length of five carbons for long-chain branches).

Although conventional $^{13}$C NMR spectroscopy cannot determine the length of a long-chain branch in excess of about six carbon atoms, there are other known techniques useful for quantifying or determining the presence of long-chain branches in ethylene-based polymers, such as ethylene/1-octene interpolymers. For those ethylene-based polymers wherein the $^{13}$C resonances of the comonomer overlap completely with the $^{13}$C resonances of the long-chain branches, either the comonomer or the other monomers (such as ethylene) can be isotopically labeled so that the long-chain branches can be distinguished from the comonomer. For example, a copolymer of ethylene and 1-octene can be prepared using $^{13}$C-labeled ethylene. In this case, the resonances associated with macromer incorporation will be significantly enhanced in intensity and will show coupling to neighboring $^{13}$C carbons, whereas the octene resonances will be unenhanced.

Alternatively, the degree of long-chain branching in ethylene-based polymers may be quantified by determination of the branching index, $g'_{vis}$. The branching index $g'_{vis}$ is defined by the following equation:

$$g'_{vis} = \frac{IV_{Br}}{IV_{Lin}}\bigg|_{Mw}$$

where $IV_{Br}$ is the intrinsic viscosity of the ethylene-based polymer composition and $IV_{Lin}$ is the intrinsic viscosity of the corresponding linear ethylene-based polymer having substantially the same weight average molecular weight and molecular weight distribution as the ethylene-based polymer composition and in the case of copolymers and terpolymers, substantially the same relative molecular proportion or proportions of monomer units. For the purposes, the molecular weight and molecular weight distribution are considered "the same" if the respective values for the branched polymer and the corresponding linear polymer are within 10% of each other. Preferably, the molecular weights are the same and the MWD of the polymers are within 10% of each other. A method for determining intrinsic viscosity of polyethylene is described in Macromolecules, 2000, 33, pp. 7489-7499. Intrinsic viscosity may be determined by dissolving the linear and branched polymers in an appropriate solvent, e.g., trichlorobenzene, typically measured at 135° C. Another method for measuring the intrinsic viscosity of a polymer is ASTM D5225-98—Standard Test Method for Measuring Solution Viscosity of Polymers with a Differential Viscometer, which is incorporated by reference herein in its entirety.

The branching index, $g'_{vis}$, is inversely proportional to the amount of branching. Thus, lower values for $g'$ indicate relatively higher amounts of branching. The amounts of short and long-chain branching each contribute to the branching index according to the formula: $g'_{vis}=g'LCB\times g'SCB$. Thus, the branching index due to long-chain branching may be calculated from the experimentally determined value for $g'$ as described by Scholte, et al., in J. App. Polymer Sci., 29, pp. 3763-3782 (1984), incorporated herein by reference.

As used herein, when a "formulation" is said to comprise a certain component, the formulation may comprise only that component and does not necessarily comprise other components.

The term "comparable film" refers to film having essentially the same composition and structure as an inventive film, with the proviso that the amount of polyalphaolefin in Layer A as described below is replaced by an equal amount the propylene-based elastomer of Layer A. In other words, where an inventive film might be a 50 μm film comprising a Layer A/Layer B/Layer C structure having a layer thickness distribution of 1/2/1 wherein Layer A is formed from 80.0 wt. % of an ethylene-based polymer, 10.0 wt. % of a propylene-based elastomer and 10.0 wt. % of a polyalphaolefin, the comparable film would be a 50 μm film comprising a Layer A/Layer B/Layer C structure having a layer thickness distribution of 1/2/1 wherein Layer A is formed from 80.0 wt. % of the ethylene-based polymer and 20.0 wt. % of a propylene-based elastomer. Any modifiers, additives, and/or additive packages used in the inventive film should also be used in the polymers of the comparable film. And of course, the method of making the comparable film should be essentially the same as that of the inventive counterpart.

As used herein, the term "free of" or "essentially free of" means that the element, compound substance, e.g. in question is not added deliberately to the composition. If present, it is present at less than 1 wt. %, preferably less than 0.5 wt. %, preferably less than 0.1 wt. %, preferably less than 0.05 wt. %, preferably less than 0.01 wt. %, based on the total weight of the composition.

Masterbatch Blends for Cling Improvement

Compositions suitable for improving the cling performance in stretch-cling films comprise a) 80.0 to 99.5 wt. % of a propylene-based elastomer described below and b) 0.5 to 20.0 wt. % of a polyalphaolefin described below, wherein the amounts of the propylene-based elastomer and the polyalphaolefin are based on the weight of the composition. In particular embodiments, the propylene-based elastomer is present in an amount of 85.0 to 99.0 wt. %, 85.0 to 95.0 wt. %, 90.0 to 99.0 wt. %, 88.0 to 98.0 wt. %, or 90.0 to 95.0 wt. %; and the polyalphaolefin is present preferably in an amount of 1.0 to 15.0 wt. %, 2.0 to 12.0 wt. %, 5.0 to 15.0 wt. %, 1.0 to 10.0 wt. %, or 5.0 to 10.0 wt. %.

Cling Layer Compositions

Compositions described herein may include about 50.0 to about 99.8 wt. % of one or more ethylene-based polymers described in further detail below, particularly 70.0 to 99.0 wt. %, 99.0 to 85.0 wt. %, or 98.0 to 90.0 wt. %. The upper limit on the amount of ethylene-based polymers in the composition may be 99.5 wt. %, 99.0 wt. %, 98.5 wt. %, 98.0 wt. %, 97.5 wt. %, 97.0 wt. %, 96.5 wt. %, 96.0 wt. %, 95.0 wt. %, 92.5 wt. %, 90.0 wt. %, 85.0 wt. %, 80.0 wt. %, 75.0 wt. %, 70.0 wt. %, 65.0 wt. %, 60.0 wt. %, 55.0 wt. %, or 50.0 wt. %. The lower limit on the amount of ethylene-based polymer in such compositions may be 50.0 wt. %, 55.0 wt. %, 60.0 wt. %, 65.0 wt. %, 70.0 wt. %, 75.0 wt. %, 80.0 wt. %, 85.0 wt. %, 90.0 wt. %, 92.5 wt. %, 95.0 wt. %, 96.0 wt. %, 96.5 wt. %, 97.0 wt. %, 97.5 wt. %, 98.0 wt. %, 98.5 wt. %, 99.0 wt. % or 99.5 wt. %. Compositions including any upper and lower limit of ethylene-based are envisioned (e.g., 55.5 to 99.5 wt. %, 90.0 to 97.5 wt. %, 92.5 to 98.0 wt. %, 75.0 to 96.5 wt. %, etc.).

Embodiments generally include about 0.1 to about 25.0 wt. % of a propylene-based elastomer, particularly 5.0 to 20.0 wt. %, 5.0 to 15.0 wt. %, or 5.0 to 10.0 wt. %. In particular embodiments, the upper limit on the amount of propylene-based elastomer may be 25.0 wt. %, 22.5 wt. %, 20.0 wt. %, 17.5 wt. %, 15.0 wt. %, 12.5 wt. %, 10.0 wt. %, 7.5 wt. %, 5.0 wt. %, 4.0 wt. %, 3.0 wt. %, 2.0 wt. %, 1.0 wt. %, 0.75 wt. %, 0.50 wt. %, 0.30 wt. %, 0.2 wt. %, or 0.1 wt. %. The lower limit on the amount of propylene-based elastomer in some embodiments may be 0.10 wt. %, 0.20 wt. %, 0.30 wt. %, 0.50 wt. %, 0.75 wt. %, 1.0 wt. %, 2.0 wt. %, 3.0 wt. %, 4.0 wt. %, 5.0 wt. %, 7.5 wt. %, 10.0 wt. %, 12.5 wt. %, 15.0 wt. %, 17.5 wt. %, 20.0 wt. %, 22.5 wt. %, or 25.0 wt. %. Compositions including any upper and lower limit of propylene-based elastomer are envisioned (e.g., 1.0 to 20.0 wt. %, 2.0 to 15.0 wt. %, 5.0 to 12.5 wt. %, 10.0 to 15.0 wt. %, 10.0 to 20.0 wt. %, etc.). In particular embodiments, the ratio (wt/wt) of ethylene-based polymer to propylene-based elastomer is e.g., 2.0 to 20.0, 4.0 to 15.0, or about 8.0 to 12.0.

Embodiments generally include about 0.1 to about 25.0 wt. % of polyalphaolefin, particularly 1.0 to 20.0 wt. %, 5.0 to 15.0 wt. %, or 7.0 to 12.5 wt. %. In particular embodiments, the upper limit on the amount of polyalphaolefin may be 25.0 wt. %, 22.5 wt. %, 20.0 wt. %, 17.5 wt. %, 15.0 wt. %, 12.5 wt. %, 10.0 wt. %, 7.5 wt. %, 5.0 wt. %, 4.0 wt. %, 3.0 wt. %, 2.0 wt. %, 1.0 wt. %, 0.75 wt. %, 0.50 wt. %, 0.30 wt. %, 0.2 wt. %, or 0.1 wt. %. The lower limit on the amount of polyalphaolefin in some embodiments may be 0.10 wt. %, 0.20 wt. %, 0.30 wt. %, 0.50 wt. %, 0.75 wt. %, 1.0 wt. %, 2.0 wt. %, 3.0 wt. %, 4.0 wt. %, 5.0 wt. %, 7.5 wt. %, 10.0 wt. %, 12.5 wt. %, 15.0 wt. %, 17.5 wt. %, 20.0 wt. %, 22.5 wt. %, or 25.0 wt. %. Compositions including any upper and lower limit of polyalphaolefin are envisioned (e.g., 0.2 to 22.5 wt. %, 0.5 to 10.0 wt. %, 0.75 to 7.5 wt. %, 1.0 to 5.0 wt. %, 0.50 to 2.0 wt. %, etc.). In particular embodiments, the ratio (wt/wt) of propylene-based elastomer to polyalphaolefin is e.g., 2.0 to 20.0, 4.0 to 13.0, or about 6.0 to 9.0. The ratio (wt/wt) of ethylene-based polymer to polyalphaolefin in exemplary embodiments may be from 20.0 to 135.0, 30.0 to 130.0, or 40.0 to 120.

Propylene-Based Elastomers

The propylene-based elastomer is a copolymer of propylene-derived units and units derived from at least one of ethylene or a $C_4$ to $C_{10}$ α-olefin. The copolymer may contain at least about 60.0 wt. % propylene-derived units of the propylene-based elastomer. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In some embodiments where more than one comonomer derived from at least one of ethylene or a $C_4$ to $C_{10}$ α-olefin is present, the amount of one comonomer may be less than about 5.0 wt. % of the propylene-based elastomer, but the combined amount of comonomers of the propylene-based elastomer is about 5.0 wt. % or greater.

In a preferred embodiment, the comonomer is ethylene, 1-hexene, or 1-octene. In one embodiment, the propylene-based elastomer comprises ethylene-derived units. The propylene-based elastomer may comprise about 5.0 to about 25.0 wt. %, preferably about 8.0 to about 22.5 wt. %, or about 9.0 to about 20.0 wt. % ethylene-derived units within the propylene-based elastomer. In some embodiments, the propylene-based elastomer consists essentially of units derived from propylene and ethylene, i.e., the propylene-based elastomer does not contain any other comonomer in an amount typically present as impurities in the ethylene and/or propylene feedstreams used during polymerization or an amount that would materially affect the heat of fusion, melting point, crystallinity, or melt flow rate of the propylene-based elastomer, or any other comonomer intentionally added to the polymerization process.

The propylene-based elastomer may have a triad tacticity of three propylene units, as measured by $^{13}$C NMR, of at least about 75.0%, at least about 80.0%, at least about 82.0%, at least about 85.0%, or at least about 90.0%. Preferably, the propylene-based elastomer has a triad tacticity of about 50.0 to about 99.0%, about 60.0 to about 99.0%, more preferably about 75.0 to about 99.0% or about 80.0 to about 99.0%. In some embodiments, the propylene-based elastomer may have a triad tacticity of about 60.0 to 97.0%.

The propylene-based elastomer has a heat of fusion ("$H_f$"), as determined by DSC, of about 80.0 J/g or less, preferably about 70.0 J/g or less, about 50.0 J/g or less, or about 35.0 J/g or less. The propylene-based elastomer may have a lower limit $H_f$ of about 0.5 J/g, about 1.0 J/g, or about 5.0 J/g. For example, the $H_f$ value may be anywhere from 1.0, 1.5, 3.0, 4.0, 6.0, or 7.0 J/g, to 30.0, 35.0, 40.0, 50.0, 60.0, 70.0, 75.0, or 80.0 J/g.

The propylene-based elastomer may have a percent crystallinity, as determined according to the DSC procedure described herein, of about 2.0 to about 65.0%, preferably about 0.5 to about 40.0%, preferably about 1.0 to about 30.0%, and more preferably about 5.0 to about 35.0%, of isotactic polypropylene. The thermal energy for the highest order of propylene (i.e., 100% crystallinity) is estimated at 189 J/g. In some embodiments, the copolymer has crystallinity less than 40%, in the range of about 0.25 to about 25.0%, or about 0.5 to about 22.0% of isotactic polypropylene. Embodiments of the propylene-based elastomer may have a tacticity index m/r from a lower limit of about 4 or about 6 to an upper limit of about 8 or about 10 or about 12. In some embodiments, the propylene-based elastomer has an isotacticity index greater than 0%, or within the range having an upper limit of about 50.0% or about 25.0%, and a lower limit of about 3.0% or about 10.0%.

In some embodiments, crystallinity of the propylene-based elastomer is reduced by copolymerization of propylene with limited amounts of one or more comonomers selected from: ethylene, $C_4$ to $C_{20}$ α-olefins, and polyenes. In these copolymers, the amount of propylene-derived units present in the propylene-based elastomer ranges from an upper limit of about 95.0 wt. %, about 94.0 wt. %, about 92.0 wt. %, about 90.0 wt. %, or about 85.0 wt. %, to a lower limit of about 60.0 wt. %, about 65.0 wt. %, about 70.0 wt. %, about 75.0 wt. %, about 80.0 wt. %, about 84.0 wt. %, or about 85.0 wt. % of the propylene-based elastomer.

The propylene-based elastomer may have a single peak melting transition as determined by DSC. In one embodiment, the copolymer has a primary peak transition of about 90° C. or less (e.g., 40 to 50° C.), with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 100° C. or less, about 90° C. or less, about 80° C. or less, or about 70° C. or less. In one embodiment, the propylene-based elastomer has a $T_m$ of about 25 to about 105° C., preferably about 60 to about 105° C., about 70 to about 105° C., or about 90 to about 105° C.

The propylene-based elastomer may have a density of about 0.850 to about 0.920 g/cm$^3$, about 0.860 to about 0.900 g/cm$^3$, preferably about 0.860 to about 0.880 g/cm$^3$, at room temperature as measured per ASTM D1505.

The propylene-based elastomer may have a melt flow rate ("MFR"), as measured per ASTM D1238, 2.16 kg at 230° C., of at least about 2 g/10 min. In one embodiment, the propylene-based elastomer has an MFR about 2.0 to about 20.0 g/10 min, about 2.0 to about 10.0 g/10 min, or about 2.0 to about 5.0 g/10 min.

The propylene-based elastomer may have an Elongation at Break of less than about 2000%, less than about 1000%, or less than about 800%, as measured per ASTM D412.

The propylene-based elastomer typically has a weight average molecular weight ($M_w$) of about 5.00×10$^3$ to about 5.00×10$^6$ g/mol, preferably about 1.00×10$^4$ to about 1.00×10$^6$ g/mol, and more preferably about 5.00×10$^4$ to about 4.00×10$^5$ g/mol; a number average molecular weight ($M_n$) of about 2.50×10$^3$ to about 2.50×10$^5$ g/mol, preferably about 1.00×10$^4$ to about 2.50×10$^5$ g/mol, and more preferably about 2.50×10$^4$ to about 2.00×10$^5$ g/mol; and/or a z-average molecular weight ($M_z$) of about 1.00×10$^4$ to about 7.00×10$^6$ g/mol, preferably about 8.00×10$^4$ to about 7.00×10$^5$ g/mol, and more preferably about 1.00×10$^5$ to about 5.00×10$^5$ g/mol. The propylene-based elastomer may have a molecular weight distribution ("MWD") of about 1.5 to about 20, or about 1.5 to about 15, preferably about 1.5 to about 5, and more preferably about 1.8 to about 3, and most preferably about 1.8 to about 2.5.

Preferred propylene-based elastomers are available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands). The particular grade(s) of commercially available propylene-based elastomer suitable for use in the invention can be readily determined using methods commonly known in the art.

In certain embodiments, the propylene-based elastomer is an elastomer having propylene-crystallinity, a melting point by DSC equal to or less than 105° C., and a $H_f$ of from about 5 J/g to about 30 J/g. The propylene-derived units are present in an amount of about 80 to about 90 wt. %, based on the total weight of the propylene-based elastomer. The ethylene-derived units are present in an amount of about 9 to about 18 wt. %, for example, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18 wt. %, based on the total weight of the propylene-based elastomer.

The propylene-based elastomer may comprise copolymers prepared according to the procedures described in WO 02/36651, U.S. Pat. No. 6,992,158, and/or WO 00/01745, the contents of which are incorporated herein by reference. Preferred methods for producing the propylene-based elastomer may be found in U.S. Pat. Nos. 7,232,871 and 6,881,800, the contents of which are incorporated herein by reference. The invention is not limited by any particular polymerization method for preparing the propylene-based elastomer, and the polymerization processes are not limited by any particular type of reaction vessel.

Polyalphaolefin

In general polyalphaolefins (PAOs) are oligomers of α-olefins (also known as 1-olefins) and are often used as the base stock for synthetic lubricants. PAOs are typically produced by the polymerization of α-olefins, preferably linear α-olefins. A PAO may be characterized by any type of tacticity, including isotactic or syndiotactic and/or atactic, and by any degree of tacticity, including isotactic-rich or syndiotactic-rich or fully atactic. PAO liquids are described in, for example, U.S. Pat. Nos. 3,149,178; 4,827,064; 4,827,073; 5,171,908; and 5,783,531; and in SYNTHETIC LUBRICANTS AND HIGH-PERFORMANCE FUNCTIONAL FLUIDS, Leslie R. Rudnick & Ronald L. Shubkin, eds. (Marcel Dekker, 1999), pp. 3-52. PAOs are Group 4 compounds, as defined by the American Petroleum Institute (API).

Useful PAOs may be made by any suitable means known in the art, and the invention is not herein limited by the manufacturing method. The PAOs may be prepared by the oligomerization of an α-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+$TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts). Subsequent to the polymerization, the PAO may be hydrogenated in order to reduce any residual unsaturation. PAO's may be hydrogenated to yield substantially (>99 wt. %) paraffinic materials. The PAO's may also be functionalized to comprise, for example, esters, polyethers, polyalkylene glycols, and the like.

In general, PAOs are high purity hydrocarbons with a paraffinic structure and a high-degree of side-chain branching. The PAO may have irregular branching or regular branching. The PAO may comprise oligomers or low molecular weight polymers of branched and/or linear alpha olefins. In one embodiment, the PAO comprises $C_6$ to $C_{2000}$, or $C_{15}$ to $C_{1500}$, or $C_{20}$ to $C_{1000}$, or $C_{30}$ to $C_{800}$, or $C_{35}$ to $C_{400}$, or $C_{40}$ to $C_{250}$ oligomers of α-olefins. These oligomers may be dimers, trimers, tetramers, pentamers, etc. In another embodiment, the PAO comprises $C_2$ to $C_{24}$, preferably $C_5$ to $C_{18}$, more preferably $C_6$ to $C_{14}$, even more preferably $C_8$ to $C_{12}$, most preferably $C_{10}$ branched or linear α-olefins. In another embodiment, the PAO comprises $C_3$ to $C_{24}$, preferably $C_5$ to $C_8$, more preferably $C_6$ to $C_{14}$, most preferably $C_8$ to $C_{12}$ linear α-olefins (LAOs). Suitable olefins include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred. Preferably $C_2$, $C_3$, and $C_4$ α-olefins (i.e., ethylene, propylene and 1-butene and/or isobutylene) are present in the PAO oligomers at an average concentration of 30 wt. % or less, or 20 wt. % or less, or 10 wt. % or less, or 5 wt. % or less; more preferably $C_2$, $C_3$, and $C_4$ α-olefins are not present in the PAO oligomers. Useful PAOs are described more particularly in, for example, U.S. Pat. Nos. 5,171,908 and 5,783,531, both of which are herein incorporated by reference.

In one embodiment, a single LAO is used to prepare the oligomers. In this case, a preferred embodiment involves the oligomerization of 1-decene, and the PAO is a mixture of oligomers (including, for example, dimers, trimers, tetramers, pentamers, and higher) of 1-decene. In another embodiment, the PAO comprises oligomers of two or more $C_3$ to $C_{18}$ LAOs (preferably $C_5$ to $C_{18}$ LAOs), to make 'bipolymer' or 'terpolymer' or higher-order copolymer combinations, provided that $C_3$ and $C_4$ LAOs are present at 10 wt. % or less. In this case, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene 'terpolymer'.

In another embodiment, the PAO comprises oligomers of a single α-olefin species having a carbon number of 5 to 24 (preferably 6 to 18, preferably 8 to 12, most preferably 10). In another embodiment, the PAO comprises oligomers of mixed α-olefins (i.e., involving two or more α-olefin species), each α-olefin having a carbon number of 3 to 24 (preferably 5 to 24, preferably 6 to 18, most preferably 8 to 12), provided that α-olefins having a carbon number of 3 or 4 are present at 10 wt. % or less. In a particularly preferred embodiment, the PAO comprises oligomers of mixed α-olefins (i.e., involving two or more α-olefin species) where the weighted average carbon number for the α-olefin mixture is 6 to 14 (preferably 8 to 12, preferably 9 to 11).

In another embodiment, the PAO comprises oligomers of one or more α-olefin with repeat unit formulas of:

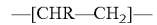
—[CHR—$CH_2$]— where R is a $C_3$ to Cis saturated hydrocarbon branch. Preferably R is constant for all oligomers. In another embodiment, there is a range of R substituents covering carbon numbers from 3 to 18. Preferably R is linear, i.e.,

R is $(CH_2)_zCH_3$, where z is 2 to 17 (preferably 3 to 11, preferably 4 to 9).

Optionally, R may contain one methyl or ethyl branch, i.e.,

R is $(CH_2)_m[CH(CH_3)](CH_2)_nCH_3$ or $(CH_2)_x[CH(CH_2CH_3)](CH_2)_yCH_3$, where (m+n) is 1 to 15 (preferably 1 to 9, preferably 3 to 7) and (x+y) is 1 to 14 (preferably 1 to 8, preferably 2 to 6). Preferably m>n. Preferably m is 0 to 15 (preferably 2 to 15, preferably 3 to 12, preferably 4 to 9) and n is 0 to 10 (preferably 1 to 8, preferably 1 to 6, preferably 1 to 4). Preferably x>y. Preferably x is 0 to 14 (preferably 1 to 14, preferably 2 to 11, preferably 3 to 8) and y is 0 to 10 (preferably 1 to 8, preferably 1 to 6, preferably 1 to 4). Preferably the repeat units are arranged in a head-to-tail fashion with minimal heat-to-head connections.

The PAO may be atactic, isotactic, or syndiotactic. In one embodiment, the PAO has essentially the same population of meso [m] and racemic [r] dyads (preferably neither [m] nor [r] greater than 60%, preferably neither greater than 55%) as measured by $^{13}$C-NMR, making it atactic. In another embodiment, the PAO has more than 60% (preferably more than 70%, preferably more than 80%, preferably more than 90%) meso dyads [m]. In another embodiment, the PAO has more than 60% (preferably more than 70%, preferably more than 80%, preferably more than 90%) racemic dyads [r]. In one embodiment, [m]/[r] determined by $^{13}$C-NMR is between 0.9 and 1.1 in one embodiment, [m]/[r] is greater than 1 in another embodiment, and [m]/[r] is less than 1 in yet another embodiment.

Preferred PAOs have a "branching ratio" as defined in U.S. Pat. No. 4,827,064 and measured according to the method described therein, of 0.20 or less, preferably 0.19 or less, preferably 0.18 or less, preferably 0.17 or less, preferably 0.15 or less, preferably 0.12 or less, preferably 0.10 or less.

Some useful PAOs typically possess a number average molecular weight ($M_n$) in the range of $1.00 \times 10^2$ to $2.10 \times 10^4$ g/mol or $3.00 \times 10^2$ to $1.50 \times 10^4$ g/mol, or in the range of $2.00 \times 10^2$ to $1.00 \times 10^4$, or $2.00 \times 10^2$ to $7.00 \times 10^3$, or $6.00 \times 10^2$ to $3.00 \times 10^3$, or $2.00 \times 10^2$ to $2.00 \times 10^3$, or $2.00 \times 10^2$ to $5.00 \times 10^2$ g/mol.

Some useful PAOs have a weight average molecular weight ($M_w$) of less than $1.00 \times 10^4$ g/mol, or less than $5.00 \times 10^3$ g/mol, or less than $4.00 \times 10^3$ g/mol, or less than $2.00 \times 10^3$ g/mol, or less than $5.00 \times 10^2$ g/mol. In some embodiments, the PAO may have an $M_w$ of $5.00 \times 10^2$ g/mol or more, $1.00 \times 10^3$ g/mol or more, or $2.00 \times 10^3$ g/mol or more, or $2.50 \times 10^3$ g/mol or more, or $3.00 \times 10^3$ g/mol or more, or $3.50 \times 10^3$ g/mol or more (e.g., $1.00 \times 10^3$ to $3.50 \times 10^3$ g/mol, $1.00 \times 10^3$ to $3.00 \times 10^3$ g/mol, or $1.25 \times 10^3$ to $2.50 \times 10^3$ g/mol). In other embodiments the PAO may have an $M_w$ of about $5.0 \times 10^2$ to about $1.0 \times 10^4$ g/mol, preferably about $7.5 \times 10^2$ to about $5.0 \times 10^3$ g/mol, preferably $1.0 \times 10^3$ to $2.0 \times 10^3$ g/mol. In one or more embodiments, the PAO or blend of PAOs has a molecular weight distribution as characterized by the ratio of the weight- and number-averaged molecular weights ($M_w/M_n$) of 4 or less, or 3 or less, or 2.5 or less, or 2.3 or less, or 2.1 or less, or 2.0 or less, or 1.9 or less, or 1.8 or less. In other embodiments, the PAO or blend of PAOs has an $M_w/M_n$ in the range of 1 to 2.5, preferably 1.1 to 2.3, or 1.1 to 2.1, or 1.1 to 1.9.

Some useful PAOs have a kinematic viscosity ("KV") at 100° C., as measured by ASTM D445 at 100° C., of 3 cSt (1 cSt=1 mm$^2$/s to 3,000 cSt, 4 to 1,000 cSt, 6 to 300 cSt, 8 to 125 cSt, preferably 8 to 100 cSt, preferably 10 to 60 cSt). In another embodiment, the PAO has a KV at 100° C. of 10 to 1000 cSt, preferably 10 to 300 cSt, preferably 10 to 100 cSt. In yet another embodiment, the PAO has a KV at 100° C. of about 4 to 8 cSt. In yet another embodiment, the PAO has a KV at 100° C. of 1 to 3 cSt.

In a particular embodiment, useful PAOs have a kinematic viscosity ("KV") as measured by ASTM D445 at 25° C. of 5.0 to about $1.5 \times 10^3$ cSt, about $5.0 \times 10^2$ to $1.0 \times 10^3$ cSt, or $1.0 \times 10^2$ to $5.0 \times 10^2$ cSt.

PAO's may also have a viscosity index ("VI"), as determined by ASTM D2270, 90 to 400, or 120 to 350, or 130 to 250, or 100 to 180, or preferably 120 to 175, or 130 to 160.

In yet another preferred embodiment, the PAO has a pour point of −100° C. to 0° C., preferably −100° C. to −10° C., preferably −90° C. to −15° C., −80° C. to −20° C. In another embodiment, the PAO or blend of PAOs has a pour point of −25 to −75° C., preferably −40 to −60° C.

In yet another preferred embodiment, the PAO has a glass transition temperature ($T_g$) of −40° C. or less, preferably −50° C. or less, preferably −60° C. or less, preferably −70° C. or less, preferably −80° C. or less. In another embodiment, the PAO or blend of PAOs has a $T_g$ of −50 to −120° C., preferably −60 to −100° C., preferably −70 to −90° C.

In yet another preferred embodiment, the PAO has a flash point of 200° C. or more, preferably 210° C. or more, preferably 220° C. or more, preferably 230° C. or more, preferably between 240° C. and 290° C.

In yet another preferred embodiment, the PAO has a specific gravity (15.6/15.6° C., 1 atm/l atm) of 0.79 to 0.90, preferably 0.80 to 0.89, preferably 0.81 to 0.88, preferably 0.82 to 0.87, 0.83 to 0.86 or 0.84 to 0.85.

Particularly preferred PAOs are those having (a) a flash point of 200° C. or more, preferably 210° C. or more, preferably 220° C. or more, preferably 230° C. or more; and (b) a pour point less than −20° C., preferably less than −25° C., preferably less than −30° C., preferably less than −35° C., preferably less than −40° C. and/or a KV at 100° C. of 8 cSt or more, preferably 10 cSt or more, preferably 35 cSt or more, preferably 40 cSt or more, preferably 50 cSt or more.

Further preferred PAOs have a KV at 100° C. of at least 5 to 70 cSt, particularly 10 to 50 cSt; KV at 25° C. of $0.5 \times 10^2$ to $5.0 \times 10^2$ cSt, particularly $1.0 \times 10^2$ to $5.0 \times 10^2$ cSt; a VI of 100 to 180, or preferably 120 to 175, or 130 to 160; a pour point of −25 to −75° C., preferably −40 to −60° C.; and a specific gravity preferably 0.82 to 0.87, 0.83 to 0.86 or 0.84 to 0.85.

The PAO may be comprised of one or more distinct PAO components. In one embodiment, the PAO is a blend of one or more oligomers with different compositions (e.g., different α-olefin(s) were used to make the oligomers) and/or different physical properties (e.g., KV, pour point, VI, and/or $T_g$).

Desirable PAOs are available as SpectraSyn™ and SpectraSyn Ultra™ (previously sold under the SHF and SuperSyn™ tradenames) from ExxonMobil Chemical Company (Houston, Tex., USA). Other useful PAOs include Synfluid™ available from ChevronPhillips Chemical Company (Pasadena, Tex., USA), Durasyn™ available from Innovene (Chicago, Ill., USA), Nexbase™ available from Neste Oil (Keilaniemi, Finland), and Synton™ available from Chemtura Corporation (Middlebury, Conn., USA). The percentage of carbons in chain-type paraffinic structures ($C_P$) is close to 100% (typically greater than 98% or even 99%) for PAOs.

Ethylene-Based Polymers

Ethylene-based polymers useful herein include those having a density of about 0.860 to about 0.950 g/cm$^3$, determined using chips cut from plaques compression molded in accordance with ASTM D-1928 Procedure C, aged in accordance with ASTM D-618 Procedure A, and measured as specified by ASTM D-1505. While the density of the ethylene-based polymer is generally within this range, specific embodiments may include an ethylene-based polymer having a lower density limit of 0.905 g/cm$^3$, 0.910 g/cm$^3$, 0.912 g/cm$^3$, 0.914 g/cm$^3$, 0.916 g/cm$^3$, 0.918 g/cm$^3$, 0.920 g/cm$^3$, 0.922 g/cm$^3$, 0.924 g/cm$^3$, 0.925 g/cm$^3$, 0.927 g/cm$^3$, 0.928 g/cm$^3$, 0.930 g/cm$^3$, 0.932 g/cm$^3$, 0.935 g/cm$^3$, 0.937 g/cm$^3$, 0.940 g/cm$^3$, 0.945 g/cm$^3$ or 0.950 g/cm$^3$. The upper limit on the range of density may be 0.910 g/cm$^3$, 0.912 g/cm$^3$, 0.914 g/cm$^3$, 0.916 g/cm$^3$, 0.918 g/cm$^3$, 0.920 g/cm$^3$, 0.922 g/cm$^3$, 0.924 g/cm$^3$, 0.925 g/cm$^3$, 0.927 g/cm$^3$, 0.928 g/cm$^3$, 0.930 g/cm$^3$, 0.932 g/cm$^3$, 0.935 g/cm$^3$, 0.937 g/cm$^3$, 0.940 g/cm$^3$, 0.945 g/cm$^3$ or 0.950 g/cm$^3$. Embodiments comprising one or more ethylene-based polymers having (individually or as a blend) any upper and lower limit of ethylene-based are envisioned particularly 0.905 to 0.935 g/cm$^3$ or 0.910 to 0.930 g/cm$^3$.

Ethylene-based polymers useful herein include those having a melt index of about 0.1 to 50 g/10 min., measured according to ASTM D-1238-E (190° C./2.16 kg), and referred to herein as $I_{2.16}$. While the melt index, $I_{2.16}$, of ethylene-based polymers is generally from about 0.1 g/10 min. to about 50.0 g/10 min., the upper limit on the range of the melt index may be 50.0 g/10 min., 45.0 g/10 min., 40.0 g/10 min., 35.0 g/10 min., 30.0 g/10 min., 27.5 g/10 min., 25.0 g/10 min., 22.5 g/10 min., 20.0 g/10 min., 17.5 g/10 min., 15.0 g/10 min., 12.5 g/10 min., 10.0 g/10 min., 7.5 g/10 min., 5.0 g/10 min., 2.5 g/10 min., 2.0 g/10 min., 1.0 g/10 min., 0.75 g/10 min., 0.50 g/10 min., or 0.25 g/10 min.; and the lower limit may be 0.10 g/10 min., 0.20 g/10 min., 0.25 g/10 min., 0.30 g/10 min., 0.35 g/10 min., 0.40 g/10 min., 0.45 g/10 min., 0.50 g/10 min., 0.75 g/10 min., 1.0 g/10 min., 1.25 g/10 min., 1.50 g/10 min., 2.0 g/10 min., 3.0 g/10 min., 4.0 g/10 min., 5.0 g/10 min., 7.5 g/10 min., 10.0 g/10 min., 15.0 g/10 min., 20 g/10 min., 25 g/10 min., 30 g/10 min., 35.0 g/10 min., or 40.0 g/10 min. Any upper and lower limit melt index combination are envisioned (e.g., 0.1 to 10.0 wt. %, 0.50 to 5.0 wt. %, 1.0 to 20.0 wt. %, 0.35 to 2.0 wt. %, etc.).

Properties of ethylene-based polymers useful in specific embodiments are further described below.

PE1-Type Ethylene-Based Polymers

In some embodiments, the ethylene-based polymers useful herein are heterogeneously branched ethylene-based polymers (PE1-Type). The term "heterogeneously branched ethylene-based polymer" refers to an ethylene-based polymer having a CBDI <50.0%. Typically such polymers are the result of a Ziegler polymerization process. Such polymers are also referred to as LLDPEs, more particularly sometimes as ZN LLDPEs.

Heterogeneously branched ethylene-based polymers differ from the homogeneously branched ethylene polymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear polyethylene homopolymers). The amount of each of these fractions varies depending upon the whole polymer properties desired. For example, linear polyethylene homopolymers have neither branched nor highly branched fractions, but are linear.

Heterogeneously branched PE1-type ethylene-based polymers have lower amounts of the highly branched fraction, but have a greater amount of the medium branched fraction. While ATREF will show homogeneously branched ethylene polymers typically are characterized by a single relatively narrow peak at some elution temperature, some heterogeneously branched ethylene-based polymers have a broad branching distribution, as represented by the breadth of elution temperatures over which the polymer fractions elute. Such polymers may also have a distinct peak at an elution temperature characteristic of a "linear", "high density" or "crystalline" polymer fraction. Some heterogeneously branched PE1-type polymers have a highly soluble low molecular weight fraction with high levels of comonomer incorporation.

Preferably PE1-type ethylene-based polymers have a CBDI 5.0 to 45.0%, 5.0 to 40.0%, 5.0 to 35.0%, 5.0 to 30.0%, 5.0 to 25.0%, or 5.0 to 20.0%. In particular embodiments, the CBDI of the PE1-type ethylene-based polymers is 20.0 to 50.0%, 20.0 to 45.0%, 20.0 to 35.0%, 20.0 to 30.0%, 20.0 to 25.0%, 25.0 to 30.0%, 25.0 to 35.0%, 25.0 to 40.0%, 25.0 to 45.0%, 30.0 to 35.0%, 30.0 to 40.0%, 30.0 to 45.0%, 30.0 to 50.0%, 35.0 to 40.0%, 35.0 to 40.0%, 35.0 to 45.0%, 35.0 to 50.0%, 40.0 to 45.0%, or 40.0 to 50.0%.

Particular PE1-type ethylene-based polymers have a density of 0.915 g/cm$^3$ to 0.945 g/cm$^3$, preferably 0.920 to 0.940 g/cm$^3$, and a melt index of 0.20 to 50.0 g/10 min., preferably 0.50 to 5.0 g/10 min. Preferably the CBDI of such polymers is 20.0 to 50.0%, 25.0 to 45.0%, 30.0 to 40.0%, or 35.0 to 40.0%.

PE1-type ethylene-based polymers are typically characterized by a relatively broad WMD (e.g., 3.0 to 100.0 or greater, 3.2 to 50.0, or 3.3 to 25.0).

Some PE1-type ethylene-based polymers used herein also have at least two melting points, as determined using Differential Scanning Calorimetry (DSC) between the temperature range of −30° C. to 150° C.

Some suitable PE1-type ethylene-based polymers are LLDPE grades available from ExxonMobil Chemical Company, e.g., LLDPE LL 1001 Series ethylene/butene-1 polymers having melt index of 1.0 g/10 min. and a density of 0.918 g/cm$^3$; LLDPE LL 1002 Series ethylene/butene-1 polymers having a melt index of 2.0 g/10 min. and a density of 0.918 g/cm$^3$; LLDPE LL 1107 Series ethylene/butene-1 polymers having a melt index of 0.80 g/10 min. and a density of 0.922 g/cm$^3$; LLDPE LL 1236 Series polymers having a melt index of 3.6 g/10 min. and a density of 0.925 g/cm$^3$; LLDPE LL 3001 Series ethylene/hexene-1 polymers having a melt index of 1.0 g/10 min. and a density of 0.917 g/cm$^3$; LLDPE LL 3003 Series ethylene/hexene-1 polymers having a melt index of 3.2 g/10 min. and a density of 0.918 g/cm$^3$; LLDPE LL 3201 Series ethylene/hexene-1 polymers having a melt index of 0.80 g/10 min. and a density of 0.926 g/cm$^3$; LLDPE LL 3204 Series ethylene/hexene-1 polymers having a melt index of 2.0 g/10 min. and a density of 0.942 g/cm$^3$; LLDPE LL 5002 Series polymers having a melt index of 2.0 g/10 min. and a density of 0.918 g/cm$^3$; LLDPE LL 5100 Series polymers having a melt index of 20.0 g/10 min. and a density of 0.925 g/cm$^3$; LLDPE LL 5252 Series polymers having a melt index of 52.0 g/10 min. and a density of 0.926 g/cm$^3$; LLDPE LL 6100 Series ethylene/butene-1 polymers having a melt index of 20.0 g/10 min. and a density of 0.925 g/cm$^3$; LLDPE LL 6201 Series ethylene/butene-1 polymers having a melt index of 50.0 g/10 min. and a density of 0.926 g/cm$^3$; LLDPE LL 6202 Series ethylene/butene-1 polymers having a melt index of 12.0 g/10 min. and a density of 0.926 g/cm$^3$.

PE2-Type Ethylene-Based Polymers

PE2-Type ethylene-based polymers useful in the compositions described herein comprise ≥50.0 wt. % of polymer units derived from ethylene and ≤50.0 wt. % preferably 1.0 wt. % to 35.0 wt. %, 1.0 wt. % to 15 wt. %, 1.0 to 10 wt. % or 1 to 6.0 wt. % of polymer units derived from one or more α-olefins described above, preferably hexene or octene. PE2-type ethylene-based polymers preferably have a CDBI of 60.0% or more, preferably 60.0% to 80.0%, preferably 65.0% to 80.0%. In another preferred embodiment, the PE2-type ethylene-based polymer has a density of 0.910 to 0.950 g/cm$^3$, particularly 0.912 to 0.940 g/cm$^3$, or 0.918 to 0.925 g/cm$^3$, and a CDBI of 60.0% to 80.0%, preferably between 65% and 80%. PE2-type ethylene-based polymers may have a melt index ($I_{2.16}$) of 0.5 to 20.0 g/10 min., particularly 0.8 to 5.0 g/10 min. Particularly suitable PE2-type ethylene-based polymers have a density of 0.915 to 0.925 g/cm$^3$, a melt index ($I_{2.16}$) of 1.0 to 4.5 g/10 min., and a CDBI of 60.0% to 80.0%, preferably between 65% and 80%. PE2-type ethylene-based polymers are generally considered linear, meaning they have a g'$_{vis}$≥0.98, preferably from 0.985 to 1.0, 0.990 to 1.0, or 1.0. Some such polyethylenes are available from ExxonMobil Chemical Company under the tradename Exceed™ mPE.

PE3-Type Ethylene-Based Polymers

Typically, PE3-type ethylene-based polymers have a CDBI of at least 70%, preferably ≥80.0%, preferably ≥85.0%, preferably ≥90.0%; e.g., 70.0 to 98%, 80.0 to 95.0%, or 85.0 to 90.0%.

Particular PE3-type ethylene-based polymers have a density of from about 0.910 to about 0.940 g/cm$^3$; more particularly of 0.915 to 0.925 g/cm$^3$, or of 0.918 to 0.922 g/cm$^3$.

Typically, although not necessarily, PE3-type ethylene-based polymers have a MWD of about 2.5 to about 5.5, preferably 4.0 to 5.0.

PE3-type ethylene-based polymers may also be characterized by an averaged 1% secant modulus (M) of from 10,000 to 60,000 psi (pounds per square inch), and a relation between M and the dart drop impact strength in g/mil (DIS) complying with formula (A):

$$DIS \geq 0.8*[100+e^{(11.71-0.000268M+2.183\times 10^{-9}M^2)}], \quad (A)$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil.

The relationship of the Dart Impact Strength to the averaged 1% secant modulus is thought to be an indicator of long-chain branching in the ethylene-based polymer. Thus, alternatively ethylene-based polymers of certain embodiments may be characterized as having long-chain branches. Particular ethylene-based polymers have 0.05 to 1.0, 0.05 to 0.5, 0.1 to 0.4, or 0.2 to 0.3, long-chain branches per 1000 carbon atoms. PE3-type ethylene-based polymers having levels of long-chain branching greater than 1.0 long-chain branch per 1000 carbon atoms may have some beneficial properties, e.g., improved processability, shear thinning, and/or delayed melt fracture, and/or improved melt strength. Typically, such polyethylenes have a $g'_{vis}$ of 0.85 to 0.98, particularly, 0.87 to 0.97, 0.89 to 0.97, 0.91 to 0.97, or 0.93 to 0.95.

PE3-type polyethylenes are commercially available from ExxonMobil Chemical Company as Enable™ mPEs. Such homogeneously branched long-chain branched linear polyethylenes may be made by the process described in Patent Application No. WO 1998/44011 incorporated by reference for U.S. purposes using a supported catalyst with a bridged bis-indenyl zirconocene transition metal component and methyl alumoxane cocatalyst. Lower melt index values can be reached by reducing the hydrogen level in the reactor while higher density can be obtained by reducing the level of hexene-1 comonomer using conventional process control techniques.

PE4-Type Ethylene-Based Polymers

In some embodiments the ethylene-based polymers useful herein are PE4-type ethylene-based polymers, i.e., ethylene-based polymers characterized by a broad orthogonal comonomer distribution. Some such ethylene-based polymers have at least a first peak and a second peak in a comonomer distribution analysis, wherein the first peak has a maximum at a log($M_w$) value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a log($M_w$) value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.

Some such PE4-type ethylene-based polymers may also have one or more of the following properties.

For example, some PE4-type ethylene-based polymers have minimal long-chain branching (i.e., less than 1.0 long-chain branch/1000 carbon atoms, particularly 0.05 to 0.50 long-chain branch/1000 carbon atoms). While such values are indicative of little to no long-chain branching, some long-chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

Generally, such polymers have a linear structure that is consistent with a branching index, $g'_{vis}$, of 0.98 to 1.0. Some suitable polymer compositions have a $g'_{vis}$ 0.985 to 1.0, 0.99 to 1.0, 0.995 to 1.0, or 1.0.

P4-Type ethylene-based polymers generally have a CDBI preferably less than 35.0% (e.g., from 20.0% to 35.0% or from 25.0% to 28.0%). Another way of characterizing the comonomer distribution is the Solubility Distribution Branch Index which is generally greater than 15° C., or greater than 16° C., or greater than 17° C., or greater than 18° C., or greater than 19° C., or greater than 20° C. (e.g., from about 18° C. to about 22° C. or from about 18.7° C. to about 21.4° C.). In another embodiment, the polymers have a SDBI of from about 20° C. to about 22° C.

The weight average molecular weight ($M_w$) may be from about 15,000 to about 250,000 g/mol. Preferably, the weight average molecular weight is from about 20,000 to about 200,000 g/mol, or from about 25,000 to about 150,000 g/mol.

The ethylene-based polymers have a molecular weight distribution ($M_w/M_n$) of from about 1.5 to about 5.0, particularly from about 2.0 to about 4.0, preferably from about 3.0 to about 4.0 or from about 2.5 to about 4.0.

The ratio of the z-average molecular weight ($M_z$) to weight average molecular weight ($M_w$) may be greater than about 1.5 or greater than about 1.7 or greater than about 2.0. In one embodiment, this ratio is from about 1.7 to about 3.5. In yet another embodiment, this ratio is from about 2.0 to about 3.0, or from about 2.2 to about 3.0.

Some ethylene-based polymers have a melt index ratio ($I_{21.6}/I_{2.16}$) ($I_{21.6}$ is measured by ASTM D-1238-F, i.e., 190° C./21.6 kg) of from about 10.0 to about 50.0. The polymers, in a preferred embodiment, have a melt index ratio of from about 15.0 to about 45.0, more preferably from about 20.0 to about 40.0, or from about 22 to about 38.

In some embodiments, ethylene-based polymers exhibit a melting temperature as measured by differential scanning calorimetry ("DSC") of from about 90° C. to about 130° C. An exemplary method of identifying a composition's melting temperature is determined by first pressing a sample of the composition at elevated temperature and removing the sample with a punch die. The sample is then annealed at room temperature. After annealing, the sample is placed in a differential scanning calorimeter, e.g., Perkin Elmer 7 Series Thermal Analysis System, and cooled. Then the sample is heated to a final temperature and the thermal output, ΔHf, is recorded as the area under the melting peak curve of the sample. The thermal output in joules is a measure of the heat of fusion. The melting temperature, $T_m$, is recorded as the temperature of the greatest heat absorption within the range of melting of the sample. This is called the first melt. The sample is typically held at the specified maximum test temperature to remove prior thermal history before cooling. Tc1 is the first non-isothermal crystallization temperature, which is recorded as the temperature of greatest heat generation. The sample is then cooled. The sample is reheated to form a second melt, which is more reproducible than the first melt. The peak melting temperature from the second melt is recorded as the second melting temperature, $T_m$. Tc2 is second non-isothermal crystallization temperature, and ΔHc2 is the second heat of crystallization. Preferably, ethylene-based polymers of these embodiments exhibit a 2nd melt temperature of from about 100° C. to about 130° C., or about 110° C. to about 130° C., or from about 119° C. to about 123° C. Preferably, ethylene-based polymers of these embodiments exhibit a first melt temperature of from about 95° C. to about 125° C., or from about 100° C. to about 118° C., or from about 107° C. to about 110° C.

In another embodiment, the PE4-type ethylene-based polymers described herein contain less than 5.0 ppm hafnium, generally less than 2.0 ppm hafnium, preferably less than 1.5 ppm hafnium, more preferably less than 1.0 ppm hafnium. In an embodiment, the polymer contains in the range of from about 0.01 ppm to about 2 ppm hafnium, preferably in the range of from about 0.01 ppm to about 1.5 ppm hafnium, more preferably in the range of from about 0.01 ppm to 1.0 ppm hafnium. Preferably, the amount of hafnium is greater than the amount of zirconium in the ethylene-based polymer. In other words, in particular embodiments the ratio of hafnium to zirconium (ppm/ppm) is at least 2.0, at least 10.0, at least 15, at least 17.0, at least 20.0, or at least about 25.0. While zirconium generally is present as an impurity in hafnium, it will be realized in some embodiments where particularly pure hafnium-containing catalysts are used, the amount of zirconium may be extremely low, resulting in an undetectable amount of zirconium in the ethylene-based polymer. Thus, the upper limit on the ratio of hafnium to zirconium in the polymer can be 50.0, 100.0, 200.0, 500 or more. One of ordinary skill in the art will understand that such metal content derives from the catalyst and that a hafnium-based catalyst system is likely to inadvertently include small amounts of zirconium due to the extreme difficulty in separating these two elements.

Particular PE4-type ethylene-based polymers have at least a first peak and a second peak in a comonomer distribution analysis, wherein the first peak has a maximum at a log($M_w$) value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a log($M_w$) value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.; a melt index (190° C./2.16 kg) of from about 0.1 g/10 min. to about 5.0 g/10 min.; a melt index ratio of from about 15 to about 30; a $M_w$ of from about 20,000 to about 200,000 g/mol; a $M_w/M_n$ of from about 2.0 to about 4.5; and a density of from 0.910 to 0.925 g/cm$^3$. More preferred polymers also have therein an amount of hafnium that is greater than the amount of zirconium, particularly a ratio of hafnium to zirconium (ppm/ppm) is at least 2.0, at least 10.0, at least 15.0, at least 17.0, at least 20.0, or at least about 25.0.

Ethylene-based polymers preferably have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt. %. In some embodiments, a substantially uniform comonomer content is <8.0 wt. %, <5.0 wt. %, or <2.0 wt. %. Both a substantially uniform and an orthogonal comonomer distribution can be determined using fractionation techniques such as gel permeation chromatography-differential viscometry (GPC-DV), temperature rising elution fraction-differential viscometry (TREF-DV) or cross-fractionation techniques.

Methods for Making the Composition

The ethylene-based polymer(s), propylene-based elastomer(s), and PAO(s), of the composition of the present invention can be combined using any suitable means known in the polymer processing art. Those skilled in the art will be able to determine the appropriate methods to enable intimate mixing while also achieving process economy. For example, all components can be combined by simple physical blending of constituent pellets and/or granules, since the forming of articles includes a (re)melting and mixing of the raw material(s). However, in some fabrication processes such as compression molding, little mixing of the raw material(s) occurs, and a pelletized melt blend would be preferred over simple physical blends of the constituent pellets and/or granules. In this case, the constituents are melt-blended first, to provide a compounded product.

The components and other additives can be blended by any suitable means. For example, they may be blended in a tumbler, continuous mixer, static mixer, batch mixer, extruder, or a combination thereof that is sufficient to achieve an adequate dispersion of the components. More particularly, the components may be blended by any suitable means to form the composition of the present invention, which is then suitable for further processing into useful articles.

Another method of blending the components may be to combine the components in a melt-blending (compounding) step and subsequently pelletizing the blend, using either an underwater pelletizer or a strand-cut approach (i.e., a water batch and dry pelletizer); these pellets are then used in a process to fabricate articles. This approach may involve an on-line "finishing" extruder associated with a polymerization unit, or it may involve an off-line "compounding" extruder dedicated to melt blending. Alternatively, the composition may be prepared by combining the components during a process used to fabricate articles, without first making a pelletized version of the composition; here, the PAO is added to other components in a production extruder, such as the extruder on an injection molding machine or on a continuous extrusion line, and thereafter directly processed into a film, sheet, fiber, profile, etc.

The blending may involve "dry blending" wherein the components are combined without melting. For example, one method is to contact the components in a tumbler or bowl mixer, such as a high-speed Henschel mixer. The dry blending step can then be followed, if desired, by melt blending in an extruder.

Another method of blending the components may also be to melt-blend the components in a batch mixer, such as a Banbury™ or Brabender™ mixer.

Yet another method of blending may be to melt blend the components in an extruder, such as a single-screw extruder or a twin-screw extruder. Extrusion technology for polymer blends is well known in the art, and is described in more detail in, for example, PLASTICS EXTRUSION TECHNOLOGY, F. Hensen, Ed. (Hanser, 1988), pp. 26-37, and in POLYPROPYLENE HANDBOOK, E. P. Moore, Jr. Ed. (Hanser, 1996), pp. 304-348.

PAO may be directly injected into the polymer melt using a liquid injection device at some point along the barrel, as in the case of a twin-screw extruder, or through an opening in a hollow screw shaft, as in the case of a single-screw extruder. PAO is preferably added downstream from the polymer melt zone, but alternatively the PAO can be added at a point where the polymer(s) have not fully melted yet. For example, in a twin-screw extruder, PAO can be injected after the first barrel section (preferably after the first third of the barrel, more preferably in the last third of the barrel).

Preferably PAO is added downstream of filler addition. An PAO addition point may be on top of conveying elements of screw, or on top of liquid mixing elements of screw, or prior to kneading elements of screw, or prior to liquid mixing elements of the screw. The extruder may have more than one (preferably two or three) PAO addition points along the barrel or screw shaft. Optionally, the PAO can be added via the extruder feed throat.

The components may also be blended by a combination of methods, such as dry blending followed by melt blending in an extruder, or batch mixing of some components followed by melt blending with other components in an extruder. One or more components may also be blended using a double-cone blender, ribbon blender, or other suitable blender, or in a Farrel Continuous Mixer (FCM™).

Blending may also involve a "masterbatch" approach, where the target PAO concentration is achieved by combining neat propylene-based elastomer(s) with an appropriate amount of the polyalphaolefin. This composition may then be blended with the ethylene-based elastomer to the desired concentrations. This is a common practice in polymer processing, typically used for addition of color, additives, and fillers to final compositions. Dispersion (or "letdown") of the masterbatch may take place as part of a processing step used to fabricate articles, such as in the extruder on an injection molding machine or on a continuous extrusion line, or during a separate compounding step.

Preferably the composition is prepared by melt-blending the components in a continuous mixer, such as a twin screw mixer or a Farrel Continuous Mixer (FCM™). Mixing can be performed at temperatures well above the melting point of the elastomer and/or rubber used in the composition at a rate sufficient to allow the filler(s) to exfoliate and become uniformly dispersed within the polymer to form the composition. The key issue for preparation is pelletization. It may take an extended time to optimize pellet form due to high viscosity of the material. Cutter blades may need to be replaced often.

Applications

The present invention encompasses articles comprising the compositions described herein particularly suited to films, especially monolayer and multilayer cling films.

The term "film" of the invention typically refers to blown, cast or other films having multiple layers (multilayer films). When used in multilayer films, the various polyolefin resins described herein can be used in any layer of the film, or in more than one layer of the film, as desired. When more than one layer of the film is formed, each layer can be individually formulated; i.e., the layers formed of or including the polyethylene resin can have the same or different chemical composition, density, melt index, thickness, etc., depending upon the desired properties of the film.

To facilitate discussion of different film structures of the invention, the following notation is used herein. Each layer of a film is denoted "X" or "Y", where "X" indicates a conventional film layer, and "Y" indicates a different film layer. Where a film includes more than one X layer or more than one Y layer, one or more prime symbols (', ", "', etc.) are appended to the X or Y symbol to indicate layers of the same type (conventional or inventive) that can be the same or can differ in one or more properties, such as chemical composition, density, melt index, thickness, and the like, within the range of the parameters defined herein. Finally, the symbols for adjacent layers are separated by a slash (/). Using this notation, a three-layer film having an inner layer, which is also referred to herein as a "core layer" disposed between two outer film layers, the layers would be denoted X/Y/X'. Similarly, a five-layer film of alternating layers would be denoted X/Y/X'/Y'/X". Unless otherwise indicated, the left-to-right or right-to-left order of layers does not matter, nor does the order of prime symbols; e.g., an X/Y film is equivalent to a Y/X film, and an X/X'/Y/X" film is equivalent to an X/Y/X'/X" film, for purposes of the present invention. The relative thickness of each film layer is similarly denoted, with the thickness of each layer relative to a total film thickness of 100 (dimensionless) is indicated numerically and separated by slashes; e.g., the thickness of an X/Y/X' film having X and X' layers of 10 μm each and a Y layer of 30 μm is denoted as 20/60/20.

Films may be formed by any number of well-known extrusion or coextrusion techniques. For example, any of the blown or chill roll techniques are suitable. As an embodiment of the invention, the copolymers may be extruded in a molten state through a flat die and then cooled. Alternatively, the copolymers may be extruded in a molten state through an annular die and then blown and cooled to form a tubular film. The tubular film may be axially slit and unfolded to form a flat film. The films of the invention may be unoriented, uniaxially oriented or biaxially oriented. Physical properties of the film may vary from those of the copolymers depending on the film forming techniques employed.

Multiple-layer films may be formed by methods well known in the art. Layer components may be coextruded through a coextrusion feedblock and die assembly to yield a film with two or more layers adhered together, but differing in composition. Multiple-layer films may also be formed by extrusion coating whereby a substrate material is contacted with the hot molten polymer as the polymer exits the die. For instance, an already formed film may be extrusion coated with a layer of the compositions described herein as the latter is extruded through the die. Multiple-layer films may also be formed by combining two or more single layer films prepared as described above. The total thickness of multilayer films may vary based upon the application desired. Those of skill in the art will appreciate that the thickness of individual layers for multilayer films may be adjusted based on desired end use performance, polymer compositions employed, equipment capability, and other like factors.

Thus, one embodiment provides a monolayer or multilayer film comprising: (a) a Layer A comprising (i) 99.8 to 50.0 wt. % of a first ethylene-based polymer; (ii) 0.1 to 25.0 wt. % of a first propylene-based elastomer, the propylene-based elastomer comprising at least about 60.0 wt. %, preferably at least 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and (iii) 0.1 to 25.0 wt. % of a first polyalphaolefin, wherein the amounts of the first ethylene polymer, the first propylene-based elastomer, and the first polyalphaolefin are based on the total weight of Layer A.

Optionally, the film may be a multilayer film comprising a Layer B in surface contact with Layer A. Layer B may be any suitable material and may itself comprise one or more layers. In particular embodiments, Layer B may comprise one or more ethylene-based polymers described herein. Alternatively or in addition thereto, Layer B may comprise polypropylene, polyester and EVOH, metal foils, paper, and the like. In some embodiments, Layer B may comprise a PE1-type polymer, preferably having a density of from 0.91 to 0.94 g/cm$^3$, particularly where the PE1-type ethylene-based polymer is an ethylene/hexene-1 polymers having a melt index of 2.0 to 6.0 g/10 min., preferably 2.0 to 4.0 g/10 min. and a density of 0.915 to 0.925 g/cm$^3$. In other embodiments, the Layer B may comprise a PE2-type, PE3-type, PE4-type ethylene-based polymer or blends thereof. Certain embodiments comprise a blend of an ethylene-based polymer a polypropylene homopolymer or a random propylene-based polymer having up to 10.0 wt. % of ethylene, particularly a crystalline isotactic propylene-based polymer having a melting point of at least 120° C. as determined by DSC.

Some films may include a Layer C in surface contact with a surface of B that is opposite the Layer B surface in contact with Layer A. In particular embodiments, Layer C may comprise one or more ethylene-based polymers described herein. Alternatively or in addition thereto, Layer C may comprise polypropylene, polyester and EVOH, metal foils, paper, and the like. In some embodiments, Layer C may comprise a PE1-type polymer, preferably having a density of from 0.91 to 0.94 g/cm$^3$, particularly where the PE1-type ethylene-based polymer is an ethylene/hexene-1 polymer having a melt index of 2.0 to 6.0 g/10 min., preferably 2.0 to 4.0 g/10 min. and a density of 0.915 to 0.925 g/cm$^3$. In other embodiments, the Layer C may comprise a PE2-type, PE3-type, PE4-type, ethylene-based polymer or blends thereof. Alternatively, Layer C may comprise any composition described herein. In particular, Layer C may comprise (i) 99.8 to 50.0 wt. % of a second ethylene-based polymer; wherein the second ethylene-based polymer has the same or different melt index and density as the first ethylene-based homopolymers or copolymer; (ii) optionally 0.1 to 25.0 wt. % of a second propylene-based elastomer, comprising at least about 60 wt. %, preferably at least 75.0 wt. %, propylene-derived units and about 5 to about 25 wt. % ethylene-derived units, based on total weight of the propylene-based elastomer, wherein the propylene-based elastomer has a heat of fusion of less than about 80 J/g, wherein the second propylene based elastomer has the same or different amount of ethylene derived units and/or weight average molecular weight ($M_w$) as the first propylene-based elastomer; and (iii) optionally 0.1 to 25.0 wt. % of second polyalphaolefin, wherein the second polyalphaolefin has the same or different weight average molecular weight and/or kinematic viscosity at 25° C. as the first polyalphaolefin; wherein the amounts of the second ethylene-based polymer, the second propylene-based elastomer, and the second polyalphaolefin are based on the total weight of Layer C.

The total thickness of films may vary based upon the application desired. In an embodiment the total unstretched film thickness is about 10.0 to 100.0 μm. Typically, cling films have a thickness of about 20 to 50 μm in most applications. Compositions described herein are particularly well-suited to applications benefitting from thicker films, e.g., films having a thickness of 20.0 to 100 μm, 25.0 to 100 μm, 40.0 to 100 μm, 50.0 to 100.0 μm, or 75.0 to 100.0 μm.

In some embodiments, the film may have desirably high cling force in the stretched state, especially where the cling layer is substantially or essentially free of any added tackifier. "Stretched state" is defined as a film being about or greater than 50% stretched, preferably greater than about 100% and most preferably about or greater than 200% stretched. Thus in some embodiments, the film has cling force of about $0.50\times10^2$ to $5.0\times10^2$ g/in at $2.0\times10^2$% stretch, preferably about $0.60\times10^2$ to about $2.0\times10^2$ g/in at 200% stretch, $0.60\times10^2$ to about $1.0\times10^2$ g/in at 200% stretch, $0.70\times10^2$ to about $1.2\times10^2$ g/in at 200% stretch, $1.0\times10^2$ to about $2.0\times10^2$ g/in at 200% stretch, or $1.25\times10^2$ to about $2.0\times10^2$ g/in at 200% stretch, $1.5\times10^2$ to about $2.0\times10^2$ g/in at 200% stretch. Cling is generally considered the force in grams/inch (or g/cm) required to partially peel apart two strips of film. A first film strip is attached to a 30 degree inclined plane with the outside surface (slip) facing upward. A second 1"×8" (2.5 cm×20 cm) strip is placed on top of the first strip with the inside surface (cling) facing downward. Pressure is applied to the second strip to cause the two strips to stick together. The films are prestretched to a desired percentage (e.g., 0%, 100%, 200%) and allowed to relax before testing. The end of the second strip at the base of the inclined plane is attached, by clip and string, to an apparatus which can exert a strain at a constant rate (Instron 1130). The two strips are then pulled apart at a crosshead speed of 10 cm/min. until the aforementioned string is parallel with the base of the inclined plane. The force at this point is reported as cling.

While adding cost and complication to the formulation, the cling force may be further modified if desired by use of a tackifying additive in addition to a polyalphaolefin. Tackifying additives are substances which provide sticky or adhesive qualities to copolymers, surfaces, films, or articles. Compressor oils and processing stabilizers such as antioxidants, UV stabilizers, antiblock agents and the like are excluded from this definition. Compatible tackifying additives, if used, should be miscible or form homogeneous blends with the polymers of the cling layer at conditions of fabrication and use. A wide variety of tackifying additives are known in the art and include, for example, polybutenes, polyisobutylenes, atactic polypropylenes, terpene resins, aliphatic and aromatic hydrocarbon resins, alkali metal and glycerol stearates, and hydrogenated rosins. For more details on tackifiers, see U.S. Pat. Nos. 5,114,763, 5,154,981, 5,173,343, and, 5,175,049.

There are many potential applications of films comprising the compositions described herein. Such films can be made into other forms, such as tape, by any one of a number of well-known cutting, slitting, and/or rewinding techniques. They may be useful as sealing, or oriented films. Typical articles suitable for bundling, packaging and unitizing include various foodstuffs (canned or frozen), rolls of carpet, liquid containers, and various like goods normally containerized and/or palletized for shipping, storage, and/or display. The films may also be used in surface protection applications with or without stretching. The films are effective, especially in the temporary protection of surfaces during manufacturing, transportation, etc. The surfaces of the film of this invention can be modified by such known and conventional post-forming techniques such as flame treatment, corona discharge, chemical treatment, etc.

PARTICULAR EMBODIMENTS

Embodiment A

A composition for improving the cling performance in stretch-cling films, the composition comprising: a) 80.0 to 99.5 wt. % of a propylene-based elastomer, the propylene-based elastomer comprising at least about 60 wt. %, particularly at least 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and b) 0.5 to 20.0 wt. % of a polyalphaolefin, wherein the amounts of the propylene-based elastomer, and the polyalphaolefin are based on the weight of the composition.

Embodiment B

Embodiment A, wherein the propylene-based elastomer is present in an amount of about 85.0 to 99.0 wt. %, 85.0 to 95.0 wt. %, 90.0 to 99.0 wt. %, 88.0 to 98.0 wt. %, or 90.0 to 95.0 wt. %.

Embodiment C

Embodiment A or B, wherein the polyalphaolefin is present in an amount of about 1.0 to 15.0 wt. %, 2.0 to 12.0 wt. %, 5.0 to 15.0 wt. %, 1.0 to 10.0 wt. %, or 5.0 to 10.0 wt. %.

Embodiment D

A composition comprising: (a) 99.8 to 50.0 wt. % of an ethylene-based polymer; (b) 0.1 to 25.0 wt. % of a propylene-based elastomer, the propylene-based elastomer comprising at least about 60.0 wt. %, particularly at least 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and c) 0.1 to 25.0 wt. % of a polyalphaolefin, wherein the amounts of the ethylene-based polymer, the propylene-based elastomer, and the polyalphaolefin are based on the weight of the composition.

Embodiment E

A method of making a composition comprising: combining i) 99.8 to 50.0 wt. % of an ethylene-based polymer; ii) 0.1 to 25.0 wt. % of a propylene-based elastomer, the propylene-based elastomer comprising at least about 60.0 wt. %, particularly at least 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and iii) 0.1 to 25.0 wt. % of a polyalphaolefin, wherein the amounts of the ethylene-based polymer, the propylene-based elastomer, and the polyalphaolefin are based on the weight of the composition.

Embodiment F

A film comprising: (a) a Layer A comprising (i) 99.8 to 50.0 wt. % of a first ethylene-based polymer; (ii) 0.1 to 25.0 wt. % of a first propylene-based elastomer, the propylene-based elastomer comprising at least about 60.0 wt. %, particularly at least 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and (iii) 0.1 to 25.0 wt. % of a first polyalphaolefin, wherein the amounts of the first ethylene polymer, the first propylene-based elastomer, and the first polyalphaolefin are based on the total weight of Layer A.

Embodiment G

Embodiment F, further comprising a Layer B, Layer B having a first side in surface contact with a first side of Layer A and a Layer C in surface contact with a second side of Layer B, wherein the Layer C comprises: (i) 99.8 to 50.0 wt. % of a second ethylene-based polymer; wherein the second ethylene-based polymer has the same or different melt index and density as the first ethylene-based polymer; (ii) optionally 0.1 to 25.0 wt. % of a second propylene-based elastomer, comprising at least about 60 wt. %, particularly at least 75.0 wt. %, propylene-derived units and about 5 to about 25 wt. % ethylene-derived units, based on total weight of the propylene-based elastomer, wherein the propylene-based elastomer has a heat of fusion of less than about 80 J/g, wherein the second propylene based elastomer has the same or different amount of ethylene derived units and/or weight average molecular weight ($M_w$) as the first propylene-based elastomer; and (iii) optionally 0.1 to 25.0 wt. % of second polyalphaolefin, wherein the second polyalphaolefin has the same or different weight average molecular weight and/or kinematic viscosity at 25° C. as the first polyalphaolefin; wherein the amounts of the second ethylene-based polymer, the second propylene-based elastomer, and the second polyalphaolefin are based on the total weight of Layer C.

Embodiment H

A method for improving the cling performance of a film in a stretched state comprising: a) providing a first composition comprising: i) 80.0 to 99.5 wt. % of a propylene-based elastomer, the propylene-based elastomer comprising at least about 60.0 wt. %, particularly at least about 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g and ii) 0.5 to 20.0 wt. % of a polyalphaolefin; b) combining the first composition with an ethylene-based polymer to form a second composition, the second composition comprising: (i) 99.8 to 50.0 wt. % of an ethylene-based polymer; (ii) 0.1 to 25.0 wt. % of the propylene-based elastomer; and (iii) 0.1 to 25.0 wt. % of the polyalphaolefin; and c) forming a film comprising a cling layer A comprising the second composition.

Embodiment I

A method for providing a film having a cling force in a stretched state, comprising: (a) forming a composition from at least (i) 99.8 to 50.0 wt. % of an ethylene-based polymer; (ii) 0.1 to 25.0 wt. % of a propylene-based elastomer, the propylene-based elastomer comprising at least about 60.0 wt. %, particularly at least 75.0 wt. %, propylene-derived units and about 5.0 to about 25.0 wt. % ethylene-derived units, based on total weight of the propylene-based elastomer, wherein the propylene-based elastomer has a heat of fusion of less than about 80.0 J/g; and (iii) 0.1 to 25.0 wt. % of a polyalphaolefin and (b) forming the composition into at least one layer of the film; wherein the amounts of the ethylene-based polymer, the propylene-based elastomer and the polyalphaolefin are based on the total weight of the composition.

Embodiment J

Any of Embodiments F to I, wherein the film has cling force of about $0.50 \times 10^2$ to $5.0 \times 10^2$ g/in at $2.0 \times 10^2$% stretch, preferably about $0.60 \times 10^2$ to about $2.0 \times 10^2$ g/in at 200% stretch, $0.60 \times 10^2$ to about $1.0 \times 10^2$ g/in at 200% stretch, $0.70 \times 10^2$ to about $1.2 \times 10^2$ g/in at 200% stretch, $1.0 \times 10^2$ to about $2.0 \times 10^2$ g/in at 200% stretch, or $1.25 \times 10^2$ to about $2.0 \times 10^2$ g/in at 200% stretch, $1.5 \times 10^2$ to about $2.0 \times 10^2$ g/in at 200% stretch.

Embodiment K

Any of Embodiments F to J, wherein the film has a cling force at least 15% greater than, preferably 15 to 200% greater than, 15 to 150% greater than, or 15 to 75% greater than the cling force of a comparable film.

Embodiment L

Any of Embodiments D to K, wherein the propylene-based elastomer is present in an amount of about 1.0 to 20.0 wt. %, 2.0 to 15.0 wt. %, or 5.0 to 12.5 wt. %.

Embodiment M

Any of Embodiments D to L, wherein the polyalphaolefin is present in an amount of about 0.2 to 22.5 wt. %, 0.5 to 10.0 wt. %, 0.75 to 7.5 wt. %, 1.0 to 5.0 wt. %, 0.50 to 2.0 wt. %.

Embodiment N

Any of Embodiments D to M, wherein the ethylene-based polymer is present in an amount of about 99.0 to 70.0 wt. %, preferably 99.0 to 85.0 wt. %, more preferably 98.0 to 90.0 wt. %.

Embodiment O

Any of Embodiments D to N, wherein the ethylene-based polymer has a melt index ($I_{2.16}$) of 0.10 to 50.0 g/10 min., preferably 0.1 to 20.0, more preferably 0.1 to 10.0 g/10 min. and a density of 0.860 to 0.950 g/cm$^3$, preferably 0.905 to 0.935 g/cm$^3$, preferably 0.910 to 0.930 g/cm$^3$.

Embodiment P

Any of Embodiments A to O, wherein about 8.0 to about 22.5 wt. %, or about 9.0 to about 20.0 wt. % of the polymer units in the propylene-based elastomer are ethylene-derived units; and the polypropylene-based elastomer has an MFR of about 2.0 to about 30.0 g/10 min., preferably about 2.0 to about 20.0 g/10 min., or about 2.0 to about 10.0 g/10 min.

Embodiment Q

Any of Embodiments A to P, wherein the propylene-based elastomer has a weight average molecular weight ($M_w$) of about $5.0 \times 10^3$ to about $5.0 \times 10^6$ g/mol, preferably about $1.0 \times 10^4$ to about $1.0 \times 10^6$ g/mol, and more preferably about $5.0 \times 10^4$ to about $4.0 \times 10^5$ g/mol.

Embodiment R

Any of Embodiments A to Q, wherein the propylene-based elastomer is graft modified.

Embodiment S

Any of Embodiments A to R, wherein the polyalphaolefin has a weight average molecular weight ($M_w$) of about $5.0 \times 10^2$ to about $1.0 \times 10^4$ g/mol, preferably about $7.5 \times 10^2$ to about $5.0 \times 10^3$ g/mol, preferably $1.0 \times 10^3$ to $2.5 \times 10^3$ g/mol.

Embodiment T

Any of Embodiments A to S, wherein the polyalphaolefin has a kinematic viscosity at 25° C. of about 5.0 to about $1.5 \times 10^3$ cSt, preferably about $5.0 \times 10^2$ to $1.0 \times 10^3$ cSt, preferably $1.0 \times 10^2$ to $5.0 \times 10^2$ cSt.

Embodiment U

Any of Embodiments A to T, wherein the polyalphaolefin has a pour point of −100.0 to 0° C., preferably −75.0 to −25.0° C., preferably −60.0 to −40.0° C.

EXAMPLES

The present invention, while not meant to be limited by, may be better understood by reference to the following envisioned examples and tables.

TABLE 1

Polymers for Cling Layers

| | Type | MFR (230° C.) | MI (190° C.) | C2 (wt. %) | Density (g/cm$^3$) |
|---|---|---|---|---|---|
| FPC1 | Propylene-based elastomer | 10.0 | | 12 | |
| FPC2 | Propylene-based elastomer | 7.0 | | 14 | |
| FPC3 | Propylene-based elastomer blend | 2.9 | | | |
| FPC4 (6102FL) | Propylene-based elastomer | 3.0 | | 16.0 | 0.862 |
| FPC5 (6202FL) | Propylene-based elastomer | 20.0 | | 15.0 | 0.863 |
| FPC6 (7010FL) | Propylene-based elastomer | 3.0 | | 16.6 | |
| FPC7 (7050FL) | Propylene-based elastomer | 45.0 | | 13.3 | |
| LLDPE 3003 | Ethylene-based polymer | | 3.2 | | 0.918 |

*FPC3 is made by blending Propylene copolymer with 17 wt. % C$_2$ with PP4292 (3 MFR Homopolypropylene from ExxonMobil Chemical Company) in the ratio 85:15 by weight

TABLE 2

Polyalphaolefins

| PAO | Spec. grav. (15.6/15.6° C.) | Viscosity @ 100° C., cSt | Viscosity @ 25° C., cSt | Mn | Mw | VI | Pour Point, ° C. |
|---|---|---|---|---|---|---|---|
| SHF-20 | 0.798 | 1.68 | | | | — | −63 |
| SHF-21 | 0.800 | 1.70 | | | | — | −57 |
| SHF-23 | 0.802 | 1.80 | | | | — | −54 |
| SHF-41 | 0.818 | 4.00 | | | | 123 | −57 |
| SHF-61/63 | 0.826 | 5.80 | | | | 133 | −57 |
| SHF-82/83 | 0.833 | 7.90 | | | | 135 | −54 |
| SHF-101 | 0.835 | 10.0 | | | | 136 | −54 |
| SHF-403 | 0.850 | 40.0 | | | | 152 | −39 |

TABLE 2-continued

Polyalphaolefins

| PAO | Spec. grav. (15.6/15.6° C.) | Viscosity @ 100° C., cSt | Viscosity @ 25° C., cSt | Mn | Mw | VI | Pour Point, ° C. |
|---|---|---|---|---|---|---|---|
| SHF-1003 | 0.855 | 107 | | | | 179 | −33 |
| SuperSyn 10 | | | | | | | |
| SuperSyn 2150 | 0.850 | 150 | | | | 214 | −42 |
| SuperSyn 2300 | 0.852 | 300 | | | | 235 | −30 |
| SuperSyn 21000 | 0.856 | 1,000 | | | | 305 | −18 |
| SuperSyn 23000 | 0.857 | 3,000 | | | | 388 | −9 |
| SpectraSyn 2 | 0.798 | 1.68 | 5.0 | 284 | 285 | — | −63 |
| SpectraSyn 2B | 0.802 | 1.80 | | | | — | −54 |
| SpectraSyn 4 | 0.818 | 4.00 | | | | 123 | −57 |
| SpectraSyn 5 | 0.824 | 5.1 | | | | 138 | −57 |
| SpectraSyn 6 | 0.826 | 5.80 | | | | 133 | −57 |
| SpectraSyn 8 | 0.833 | 7.90 | | | | 135 | −54 |
| SpectraSyn 10 | 0.850 | 10.0 | | | | 136 | −54 |
| SpectraSyn 40 | 0.855 | 40.0 | | | | 152 | −39 |
| SpectraSyn 100 | 0.850 | 107 | | | | 179 | −33 |
| SpectraSyn Ultra 150 | 0.850 | 150 | 1500 | 3700 | 8500 | 218 | −33 |
| SpectraSyn Ultra 300 | 0.852 | 300 | 3100 | 4900 | 11800 | 241 | −27 |
| SpectraSyn Ultra 1000 | 0.855 | 1000 | 10000 | 11000 | 28200 | 307 | −18 |
| Elevast A30 | 0.820 | 4.1 | 19 | 447 | 456 | 123 | −57 |
| Elevast A50 | 0.826 | 5.830 | 544 | 566 | 133 | −57 | |
| Elevast A70 | 0.833 | 7.9 | 47 | 641 | 673 | 135 | −54 |
| Elevast A80 | 0.835 | 10 | 66 | 720 | 756 | 136 | −54 |
| Elevast C30 | 0.850 | 40 | 400 | 1693 | 2716 | 152 | −39 |
| Elevast C70 | 0.853 | 100 | 1340 | 2960 | 7372 | 170 | −30 |

Example 1

In this example, a PE1-type ethylene-based polymer having a melt index ($I_{2.16}$) of 3.2 g/10 min. and a density of 0.918 g/cm³ (LLDPE LL 3003) is combined with a masterbatch of FPC6 and a polyalphaolefin having a KV @25° C. of 66 cSt, an $M_n$ of about 720 g/mol, and an $M_w$ of about 756 g/mol (Elevast™ A80 polymer modifier) to provide a cling layer composition having about 90.0 wt. % PE1-type ethylene-based polymer, 9.3 wt. % FPC6 and about 0.7 wt. % polyalphaolefin. The composition is formed into a monolayer film.

Example 2

Example 1 is substantially repeated except that the components are combined to provide a cling layer composition having about 80.0 wt. % PE1-type ethylene-based polymer, 17.2 wt. % FPC5 and about 2.80 wt. % of the polyalphaolefin. The composition is formed into a monolayer film.

Example 3

In this example, PE1-type ethylene-based polymer having a melt index ($I_{2.16}$) of 2.0 g/10 min. and a density of 0.918 g/cm³ (LLDPE LL 1002) is combined with a masterbatch of FPC6 and a polyalphaolefin having a KV @25° C. of 400 cSt, an $M_n$ of about 1693 g/mol, and an $M_w$ of about 2716 g/mol (Elevast™ C30 polymer modifier) to provide a cling layer composition having about 90.0 wt. % LL1002, 8.00 wt. % FPC5 and about 2.00 wt. % polyalphaolefin. The composition is coextruded to form a film structure including a noncling layer comprising a PE2-type polymer having a melt index ($I_{2.16}$) of 1.0 g/10 min. and a density of 0.923 g/cm³.

Example 4

In this example, PE2-type ethylene-based polymer having a melt index ($I_{2.16}$) of 3.5 g/10 min. and a density of 0.912 g/mol (Exceed™ 3512 mPE) is combined with a masterbatch of FPC4 and a polyalphaolefin having a KV @25° C. of 400 cSt, an $M_n$ of about 1693 g/mol, and an $M_w$ of about 2716 g/mol (Elevast™ C30 polymer modifier) to provide a cling layer composition having about 92.0 wt. % PE2-type ethylene-based polymer, 7.20 wt. % FPC4 and about 0.80 wt. % polyalphaolefin. The cling layer composition is coextruded to form a Layer A/Layer B/Layer C film structure wherein Layer A comprises the cling layer composition, the Layer B comprises a PE3-type ethylene-based polymer having a melt index ($I_{2.16}$) of 1.0 g/10 min. and a density of 0.920 g/cm³ and the Layer C comprises a PE2-type ethylene-based polymer having a melt index ($I_{2.16}$) of 3.5 g/10 min. and a density of 0.918 g/cm³.

Examples 5-8

Examples 1-4 are substantially reproduced with the exception that ethylene-based polymer of the cling layer is replaced with a PE3-type ethylene-based polymer having a melt index ($I_{2.16}$) of 1.0 g/10 min. and a density of 0.920 g/cm³.

Examples 9-12

Examples 1-4 are substantially reproduced with the exception that ethylene-based polymer of the cling layer is replaced with a PE4-type ethylene-based polymer made according to U.S. Pat. No. 6,956,088 using the bis(n-propylcyclopentadienyl)HfCl$_2$/MAO catalyst system under polymerization conditions to produce an ethylene-based polymer (PE2) having a density of 0.916 g/cm³ and a melt index ($I_{2.16}$) of 0.70 g/10 min. Further details of this PE4-type ethylene-based polymer are described in U.S. Provisional Patent Application No. 61/718,861, the disclosure of which is hereby incorporated herein in its entirety.

Without wishing to be held to any theory, it is believed that such films will possess improved cling properties with respect to comparable films lacking the polyalphaolefin. It is believed that the polyalphaolefin improves the softness of the propylene-based elastomer, thereby improving its inherent cling performance and perhaps also inhibiting its tendency to aggregate into domains within the ethylene-based elastomer matrix.

Although the present invention has been described in considerable detail with reference to certain aspects and embodiments thereof, other aspects and embodiments are possible. Therefore, the spirit and scope of the appended claims should not be limited to the description of the embodiments contained herein.

Certain features of the present invention are described in terms of a set of numerical upper limits and a set of numerical lower limits. It should be appreciated that ranges from any lower limit to any upper limit are within the scope of the invention unless otherwise indicated.

All documents described herein, including any priority documents and/or testing procedures to the extent they are not inconsistent with this text are incorporated by reference herein for all jurisdictions in which such incorporation is permitted, provided, however, that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa. In addition, the compositions, individual film layers and the overall film may be substantially free or essentially free (i.e., having less than 2.0 wt. % or less than 0.5 wt. %) of any additional component, additive, modifier, etc., not expressly recited.

What is claimed is:

1. A composition for improving the cling performance in stretch-cling films, the composition comprising:
   (a) 80.0 to 99.5 wt. % of a propylene-based elastomer, the propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g; and
   (b) 0.5 to 20.0 wt. % of a polyalphaolefin, wherein the polyalphaolefin has a pour point of −100.0 to 0° C.;
   wherein the amounts of the propylene-based elastomer and the polyalphaolefin are based on the weight of the composition;
   wherein the composition has a cling force of about $0.50 \times 10^2$ to $5.0 \times 10^2$ g/in at $2.0 \times 10^2$% stretch.

2. The composition of claim 1, wherein about 8.0 to about 22.5 wt. % of the polymer units in the propylene-based elastomer are ethylene-derived units and the polypropylene-based elastomer has a Melt Flow Rate (MFR) of about 2.0 to about 30.0 g/10 min.

3. The composition of claim 1, wherein the propylene-based elastomer has a weight average molecular weight ($M_w$) of about $5.0 \times 10^3$ to about $5.0 \times 10^6$ g/mol.

4. The composition of claim 1, wherein the polyalphaolefin is present in an amount of about 2.0 to 12.0 wt. %.

5. The composition of claim 1, wherein the polyalphaolefin has a weight average molecular weight ($M_w$) of about $5.0 \times 10^2$ to about $1.0 \times 10^4$ g/mol.

6. The composition of claim 1, wherein the polyalphaolefin has a kinematic viscosity at 25° C. of about 5.0 to about $1.5 \times 10^3$ cSt.

7. The composition of claim 1, further comprising a polyolefin.

8. A composition comprising:
   (a) 99.8 to 50.0 wt. % of an ethylene-based polymer;
   (b) 0.1 to 25.0 wt. % of a propylene-based elastomer, the propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g; and
   (c) 0.1 to 25.0 wt. % of a polyalphaolefin, wherein the polyalphaolefin has a pour point of −100.0 to 0° C.;
   wherein the amounts of the ethylene-based polymer, the propylene-based elastomer, and the polyalphaolefin are based on the weight of the composition
   wherein the composition has a cling force of about $0.50 \times 10^2$ to $5.0 \times 10^2$ g/in at $2.0 \times 10^2$% stretch.

9. The composition of claim 8, wherein the propylene-based elastomer is present in an amount of about 5.0 to 20.0 wt. %.

10. The composition of claim 8, wherein about 8.0 to about 22.5 wt. % of the polymer units in the propylene-based elastomer are ethylene-derived units and the polypropylene-based elastomer has a Melt Flow Rate (MFR) of about 2.0 to about 30.0 g/10 min.

11. The composition of claim 8, wherein the propylene-based elastomer has a weight average molecular weight ($M_w$) of about $5.0 \times 10^3$ to about $5.0 \times 10^6$ g/mol.

12. The composition of claim 8, wherein the polyalphaolefin is present in an amount of about 1.0 to 20.0 wt. %.

13. The composition of claim 8, wherein the polyalphaolefin has a weight average molecular weight ($M_w$) of about $5.0 \times 10^2$ to about $1.0 \times 10^4$ g/mol.

14. The composition of claim 8, wherein the polyalphaolefin has a kinematic viscosity at 25° C. of about 5.0 to about $1.5 \times 10^3$ cSt.

15. The composition of claim 8, wherein the polyalphaolefin has a pour point of −100.0 to 0° C.

16. A method of making a composition comprising: combining i) 99.8 to 50.0 wt. % of an ethylene-based polymer; ii) 0.1 to 25.0 wt. % of a propylene-based elastomer, the propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g; and iii) 0.1 to 25.0 wt. % of a polyalphaolefin, wherein the polyalphaolefin has a pour point of −100.0 to 0° C., wherein the amounts of the ethylene-based polymer, the propylene-based elastomer, and the polyalphaolefin are based on the weight of the composition; wherein the composition has a cling force of about $0.50\times10^2$ to $5.0\times10^2$ g/in at $2.0\times10^2$% stretch.

17. A film comprising:
(a) a Layer A comprising:
(i) 99.8 to 50.0 wt. % of a first ethylene-based polymer;
(ii) 0.1 to 25.0 wt. % of a first propylene-based elastomer, the propylene based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g; and
(iii) 0.1 to 25.0 wt. % of a first polyalphaolefin, wherein the polyalphaolefin has a pour point of −100.0 to 0° C., wherein the amounts of the first ethylene polymer, the first propylene-based elastomer, and the first polyalphaolefin are based on the total weight of Layer A;
wherein the film has a cling force of about $0.50\times10^2$ to $5.0\times10^2$ g/in at $2.0\times10^2$% stretch.

18. The film of claim 17, wherein the polyalphaolefin is present in an amount of about 1.0 to 20.0 wt. % of Layer A.

19. The film of claim 17, wherein the polyalphaolefin has a weight average molecular weight ($M_w$) of about $5.0\times10^2$ to about $1.0\times10^4$ g/mol.

20. The film of claim 17, wherein the polyalphaolefin has a kinematic viscosity at 25° C. of about 5.0 to about $1.5\times10^3$ cSt.

21. The film of claim 17, further comprising a Layer B, Layer B having a first side in surface contact with a first side of Layer A and a Layer C in surface contact with a second side of Layer B, wherein the Layer C comprises:
(i) 99.8 to 50.0 wt. % of a second ethylene-based polymer; wherein the second ethylene-based polymer has the same or different melt index and density as the first ethylene-based polymer;
(ii) optionally 0.1 to 25.0 wt. % of a second propylene-based elastomer, comprising at least about 60 wt. % propylene-derived units and about 5 to about 25 wt. % ethylene-derived units, based on total weight of the second propylene-based elastomer, wherein the second propylene-based elastomer has a heat of fusion of less than about 80 J/g; and
(iii) optionally 0.1 to 25.0 wt. % of second polyalphaolefin, wherein the amounts of the second ethylene-based polymer, the second propylene-based elastomer, and the second polyalphaolefin are based on the total weight of Layer C.

22. The film of claim 21, wherein the first and second propylene-based elastomers have a different amount of ethylene derived units and/or weight average molecular weight ($M_w$) as the first propylene-based elastomer.

23. The film of claim 21, wherein the first and second polyalphaolefins have a different weight average molecular weight and/or kinematic viscosity at 25° C.

24. A method for providing a film having a cling force in a stretched state, comprising:
(a) forming a composition from at least:
(i) 99.8 to 50.0 wt. % of an ethylene-based polymer;
(ii) 0.1 to 25.0 wt. % of a propylene-based elastomer, the propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g; and
(iii) 0.1 to 25.0 wt. % of a polyalphaolefin, wherein the polyalphaolefin has a pour point of −100.0 to 0° C.;
wherein the amounts of the ethylene-based polymer, the propylene-based elastomer, and the polyalphaolefin are based on the total weight of the composition, and
(b) forming the composition into at least one layer of the film;
wherein the film has a cling force of about $0.50\times10^2$ to $5.0\times10^2$ g/in at $2.0\times10^2$% stretch.

* * * * *